US00RE49028E

(19) United States
(12) Reissued Patent
Lee

(10) Patent Number: US RE49,028 E
(45) Date of Reissued Patent: Apr. 12, 2022

(54) PACKER APPARATUS

(71) Applicant: Paul Bernard Lee, Calgary (CA)

(72) Inventor: Paul Bernard Lee, Calgary (CA)

(21) Appl. No.: 17/099,556

(22) Filed: Nov. 16, 2020

Related U.S. Patent Documents

Reissue of:
(64) Patent No.: 9,187,989
Issued: Nov. 17, 2015
Appl. No.: 13/820,091
PCT Filed: Jan. 12, 2012
PCT No.: PCT/GB2012/050053
§ 371 (c)(1),
(2) Date: Mar. 28, 2013
PCT Pub. No.: WO2012/098377
PCT Pub. Date: Jul. 26, 2012

(30) Foreign Application Priority Data

Jan. 20, 2011 (GB) ..... 1100975

(51) Int. Cl.

| | |
|---|---|
| ***E21B 43/11*** | (2006.01) |
| ***E21B 33/126*** | (2006.01) |
| ***E21B 10/32*** | (2006.01) |
| ***E21B 33/122*** | (2006.01) |
| ***E21B 34/08*** | (2006.01) |
| ***E21B 33/13*** | (2006.01) |
| ***E21B 33/128*** | (2006.01) |
| ***E21B 43/26*** | (2006.01) |
| ***E21B 10/34*** | (2006.01) |

(Continued)

(52) U.S. Cl.
CPC ..... *E21B 43/11* (2013.01); *E21B 10/322* (2013.01); *E21B 10/345* (2013.01); *E21B 33/12* (2013.01); *E21B 33/122* (2013.01); *E21B 33/126* (2013.01); *E21B 33/1285* (2013.01); *E21B 33/13* (2013.01); *E21B 34/08* (2013.01); *E21B 43/112* (2013.01); *E21B 43/26* (2013.01)

(58) Field of Classification Search
CPC .... E21B 33/1285; E21B 33/126; E21B 33/12; E21B 43/26; E21B 10/345; E21B 34/08; E21B 10/322; E21B 33/13; E21B 43/11; E21B 33/122; E21B 43/112
See application file for complete search history.

(56) References Cited

U.S. PATENT DOCUMENTS 2,136,518 A * 11/1938 Nixon ..... 166/55.8
2,624,412 A 1/1953 Ragan
(Continued)

FOREIGN PATENT DOCUMENTS

CN 101769139 7/2010
GB 2352747 2/2001
(Continued)

*Primary Examiner* — William C Doerrler
(74) *Attorney, Agent, or Firm* — Kirton McConkie; Brian Tucker

(57) ABSTRACT

A packer apparatus usable in a well casing to provide an annular seal in the well casing. The packer apparatus includes an activation member mounted to the body wherein the activation member is moveable relative to the body to deform an elastomeric packer element outwardly relative to the body to form an annular seal in the well casing. A plurality of pistons is arranged to move the activation member relative to the body, each piston being disposed in a respective pressure chamber arranged to be filled with fluid in response to an increase in fluid pressure in the body.

17 Claims, 22 Drawing Sheets

(51) Int. Cl.
*E21B 43/112* (2006.01)
*E21B 33/12* (2006.01)

(56) References Cited

U.S. PATENT DOCUMENTS 2,715,444 A 8/1955 Fewel
2,836,250 A 5/1958 Brown
2,997,107 A 8/1961 Lynes
3,171,492 A 3/1965 Cochran
3,196,961 A 7/1965 Kammerer
3,211,221 A * 10/1965 Huitt ..... 166/298
3,659,647 A 5/1972 Brown
4,099,563 A 7/1978 Hutchison et al.
4,487,258 A 12/1984 Jackson et al.
4,519,456 A 5/1985 Cochran
4,791,992 A 12/1988 Greenlee et al.
5,152,340 A 10/1992 Clark et al.
6,957,701 B2 10/2005 Tolman et al.
8,336,615 B2 * 12/2012 Hughes ..... E21B 33/1285 166/120
8,511,394 B2 * 8/2013 Themig ..... E21B 43/12 166/387
2003/0079887 A1 5/2003 Lloyd et al.
2008/0011471 A1 1/2008 Hughes
2010/0089583 A1 4/2010 Xu et al.
2010/0258354 A1 10/2010 Eriksen
2015/0090465 A1 * 4/2015 Themig ..... E21B 34/14 166/387

FOREIGN PATENT DOCUMENTS

WO 01/34938 A1 5/2001
WO WO01/34938 * 5/2001
WO 02/08569 A1 1/2002

* cited by examiner

PACKER APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

The present invention relates to a perforating tool for perforating a downhole well casing and relates to a packer apparatus for providing an annular seal in a downhole well bore. The present invention relates particularly, but not exclusively to a downhole work string incorporating such a perforating tool and/or packer apparatus and to a method of completion of a hydrocarbon well using such a work string.

In most oil and gas wells, steel casing is run through the productive zone as a conduit to keep the formation from breaking down and falling into the well bore. In order to produce oil and/or gas from the well, the casing must be perforated so the producing fluid can enter the well bore and be extracted. The most common technique for perforating a well casing is to use explosives and blow holes in the casing at predetermined intervals. However, it is desirable to be able to perforate a well casing in a more controlled and reliable manner.

It is also desirable to provide a reliable and repeatable method of fracturing formations to enable the production of oil and gas once the well casing has been perforated. To accomplish this, it is desirable to provide a packer apparatus that enables sections of perforated well casings to be reliably isolated and sealed to enable hydraulic fracturing to take place.

Preferred embodiments of the present invention seek to overcome the above disadvantages of the prior art.

According to an aspect of the present invention, there is provided a perforating tool for perforating a downhole well casing, the tool comprising:

a body arranged to be disposed in a well casing and at least one cutter block moveable relative to the body between an inwardly retracted condition and an outwardly deployed condition to cut a perforation in the well casing;

an activation member disposed in the body, wherein the activation member is moveable relative to the body to move at least one said cutter block between the inwardly retracted condition and the outwardly deployed condition relative to the body;

a plurality of pistons arranged to move the activation member relative to the body, each said piston being disposed in a respective pressure chamber; and wherein the activation member defines a bore disposed along a longitudinal axis of the body, and wherein a plurality of ports are formed in the activation member to enable fluid to flow from the bore to each said pressure chamber such that an increase in fluid pressure in the body increases fluid pressure in each said pressure chamber to move each of the plurality of pistons relative to the body and cause the activation member to move relative to the body.

This provides the advantage of a perforating tool that can be used to reliably cut perforations through a well casing. This is advantageous because when a casing has been placed in a well bore, and particularly in long horizontal well bores through tight formations, there is generally only a very small diameter, usually less than 4 inches, available for a downhole tool. As a result, there is a lack of hydraulic working area available in the downhole tool to provide a force for moving parts to operate.

Consequently, providing a plurality of pistons arranged to move the activation member relative to the body, each said piston being disposed in a respective pressure chamber arranged to be filled with fluid in response to an increase in fluid pressure in the body to move each of the plurality of pistons relative to the body and cause the activation member to move relative to the body increases the force available to the operator which provides a tool capable of perforating a well. This therefore enables the operator to use a downhole tool rather than explosives to perforate the well casing during completion operations.

By providing an activation member defining a bore disposed along a longitudinal axis of the body, and wherein a plurality of ports are formed in the activation member to enable fluid to flow from the bore to each said pressure chamber, this also provides a compact arrangement that can fit in the limited confines of a well casing to enable a plurality of pressure chambers to be operated to increase the force available to the operator for a given fluid pressure.

In a preferred embodiment, each said piston is disposed concentrically around the activation member.

This provides the advantage of helping to enable location of a plurality of pressure chambers in a downhole tool usable in small diameter well casings to increase working force available to the operator.

In preferred embodiment, each said pressure chamber defines an annular chamber arranged concentrically around the activation member.

This provides the advantage of helping to enable location of a plurality of pressure chambers in a downhole tool usable in small diameter well casings to increase working force available to the operator.

Each said pressure chamber may further comprise a stationary seal ring to provide a seal with the body for the respective pressure chamber.

The tool may further comprise a plurality of [annular] *annularly arranged* pressure ports formed through the body adjacent each said pressure chamber to enable each said piston to move relative to the body.

In a preferred embodiment, at least one said cutter block is slidably moveable along an inclined track to be moveable between the inwardly retracted condition and outwardly deployed condition, wherein the inclined track is inclined relative to a longitudinal axis of the body such that pulling the tool upwardly out of the well casing in which it is located pushes at least one said cutter block into the inwardly retracted condition.

This provides the advantage of minimising the likelihood of the perforating tool becoming stuck in the well casing. Since the action of pulling the perforating tool out of the well will push the cutter blocks along the inclined tracks and inwardly into the body, there is little chance that the perforating tool will become stuck with the cutter blocks in the outwardly deployed condition. This also provides the advantage that the cutter blocks can be manufactured with a relatively large length. This enables large perforations to be made in the well casing and could therefore prevent the requirement to pump acid down the well bore to break down casing cement after a perforation operation.

In a preferred embodiment, the tool further comprises at least one drive member disposed on the activation member to push at least one said cutter block along the inclined track in response to movement of the activation member.

The tool may further comprise a floating piston disposed in the bore, wherein the bore is filled with oil or another working fluid and the floating piston is moveable in the bore to change the pressure of the oil or other working fluid to cause movement of the activation member.

This provides the advantage that if the perforating tool is used in a work string that conducts hydraulic fracturing operations of the formation in which the well casing is located, the floating piston prevents fracturing sand and debris from entering the internal diameter of the perforating tool. This keeps the internal diameter of the perforating tool relatively clean and reduces the likelihood of malfunction as a result of debris interfering with the internal moving parts of the perforating tool.

According to another aspect of the present invention, there is provided a method of perforating a well casing, the method comprising use of a perforating tool as defined above to form a plurality of perforations through a well casing in use.

According to another aspect of the present invention, there is provided a downhole work string comprising:

a perforating tool as defined above; and at least one cup tool disposed in the work string at a location above the perforating tool in use.

This provides the advantage that the work string can first be used to perforate the well casing and the string can then be lowered to position the cup tool or tools below the perforated section of well casing. With the work string in this position, high pressure pumping of hydraulic fracturing fluid can be commenced from the surface either between the casing and the work string in an annular configuration, or if a second cup tool is used, through the internal diameter of the work string using a ported sub to conduct a hydraulic fracturing operation.

This also provides the advantage that if the pumping pressure is high enough, the cutter blocks of the perforating tool will be deployed into the well casing to anchor the work string in position during the fracturing operation. This enables the isolation of a well bore that is exposed to high pressure and might therefore reduce the amount of fracturing fluid required. Consequently, it can be seen that this provides a highly advantageous work string that simplifies completion operations.

According to another aspect of the present invention, there is provided a downhole work string comprising:

a perforating tool as defined above; and at least one packer apparatus disposed in the work string at a location above the perforating tool in use.

This provides the advantage that the work string can first be used to perforate the well casing and the string can then be lowered to position the at least one packer apparatus below the perforated section of well casing. With the work string in this position, high pressure pumping of hydraulic fracturing fluid can be commenced from the surface either between the casing and the work string in an annular configuration, or if a second packer apparatus is used, through the internal diameter of the work string using a ported sub to conduct a hydraulic fracturing operation.

This also provides the advantage that if the pumping pressure is high enough, the cutter blocks of the perforating tool will be deployed into the well casing to anchor the work string in position during the fracturing operation. This enables the isolation of a well bore that is exposed to high pressure and might therefore reduce the amount of fracturing fluid required. Consequently, it can be seen that this provides a highly advantageous work string that simplifies completion operations.

According to another aspect of the present invention, there is provided a method of completion of a hydrocarbon well in which a well casing has been disposed, the method comprising:

use of the perforating tool of a work string as defined above to form a plurality of perforations through the well casing in use;

lowering the work string to position at least one said cup tool or packer apparatus adjacent the plurality of perforations; and pumping fracturing fluid down the hydrocarbon well to fracture the formation in use.

According to another aspect of the present invention, there is provided a packer apparatus for providing an annular seal in a downhole well casing or an open borehole, the apparatus comprising:

a body arranged to be disposed in a well casing;

an activation member mounted to the body, wherein the activation member is moveable relative to the body to deform an elastomeric packer element outwardly relative to the body to form an annular seal in a well casing in use; and a plurality of pistons arranged to move the activation member relative to the body, each said piston defining a respective pressure chamber arranged to be filled with fluid in response to an increase in fluid pressure in the body to move each of the plurality of pistons relative to the body and cause the activation member to move relative to the body.

This provides the advantage of a packer apparatus that has a deformable elastomeric packer element that is deformable outwardly to form an annular seal in a well casing for use in fracturing operations and the like.

By providing a plurality of pistons arranged to move the activation member relative to the body, wherein each said piston defines a respective pressure chamber arranged to be filled with fluid in response to an increase in fluid pressure in the body to move each of the plurality of pistons relative to the body, this provides the advantage that the force that can be exerted on the packer element can be increased, particularly in casings having a small diameter, to ensure a reliable seal is formed. This helps to ensure packer seal integrity.

In a preferred embodiment, the body comprises a cylindrical member having an internal bore defining a longitudinal axis, and wherein each said piston is mounted concentrically to the body such that a plurality of ports formed in the body enable fluid to flow from the bore to each said pressure chamber.

This provides the advantage that the apparatus is modular and that further pistons can be added if more force is required. By mounting the pistons concentrically on the cylindrical body, it is actually the outer housing of the tool that moves relative to the body and further pistons can be stacked on the body if more force is required. This provides a versatile and adaptable packer apparatus.

In a preferred embodiment, each said pressure chamber defines an annular chamber arranged concentrically around the body.

This provides the advantage of providing a compact arrangement.

Each said pressure chamber may further comprise a stationary seal ring to provide a seal with the body for the respective pressure chamber.

The activation member may comprise a ramp adapted to slide under and deform outwardly a portion of said elastomeric packer element.

According to another aspect of the present invention, there is provided a method of providing an annular seal in a well casing or an open borehole, the method comprising use of a packer apparatus as defined above.

According to another aspect of the present invention, there is provided a downhole work string comprising:

a perforating tool as defined above; and at least one packer apparatus as defined above disposed in the work string at a location above the perforating tool in use.

This provides the advantage that the work string can first be used to perforate the well casing and the string can then be lowered to position the at least one packer apparatus below the perforated section of well casing. With the work string in this position, high pressure pumping of hydraulic fracturing fluid can be commenced from the surface either between the casing and the work string in an annular configuration, or if a second packer apparatus is used, through the internal diameter of the work string using a ported sub to conduct a hydraulic fracturing operation.

This also provides the advantage that if the pumping pressure is high enough, the cutter blocks of the perforating tool will be deployed into the well casing to anchor the work string in position during the fracturing operation. This enables the isolation of a well bore that is exposed to high pressure and might therefore reduce the amount of fracturing fluid required. Consequently, it can be seen that this provides a highly advantageous work string that simplifies completion operations.

According to a further aspect of the present invention, there is provided a method of completion of a hydrocarbon well in which a well casing has been disposed, the method comprising:

use of the perforating tool of a work string as defined above to form a plurality of perforations through the well casing in use;

lowering the work string to position at least one said packer apparatus adjacent the plurality of perforations; and pumping fracturing fluid down the hydrocarbon well to both activate the packer apparatus to form an annular seal in the well and fracture the formation in use.

Preferred embodiments of the present invention will now be described, by way of example only, and not in any limitative sense, with reference to the accompanying drawings in which:

FIG. 5b is a perspective cross-sectional view corresponding to FIG. 5a;

FIG. 6b is a perspective view corresponding to FIG. 6a;

FIG. 15a is a side view of the packer apparatus in the condition of FIG. 14a;

FIG. 16a is a perspective cross-section corresponding to FIG. 14a;

FIG. 21 is a perspective cross-section corresponding to FIG. 20a; and

PERFORATING TOOL

Figure 1A:
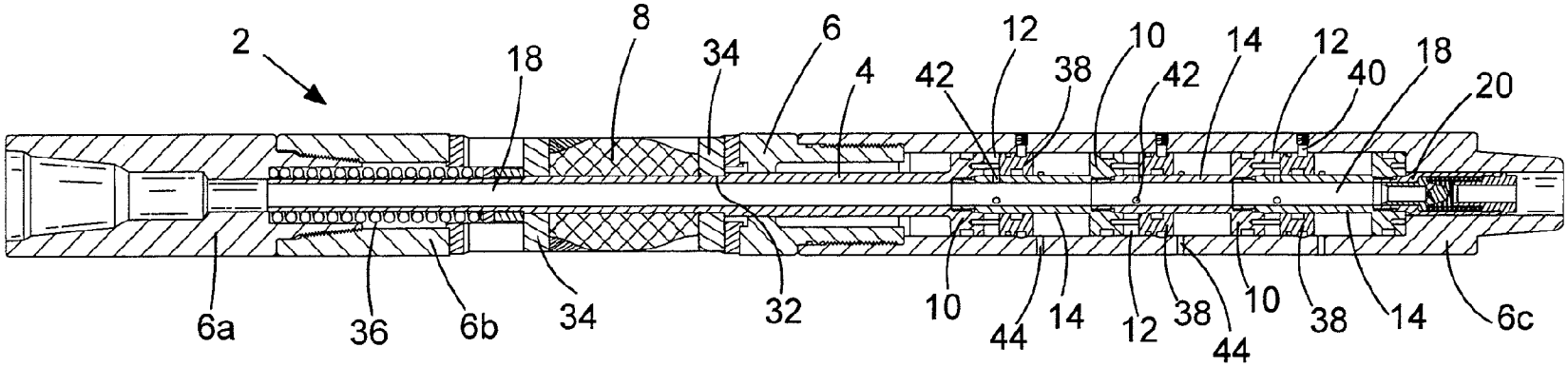
FIG. 1a is a longitudinal cross-sectional view of a perforating tool of a first embodiment of the present invention showing the cutter blocks in the inwardly retracted condition.
Figure 1B:
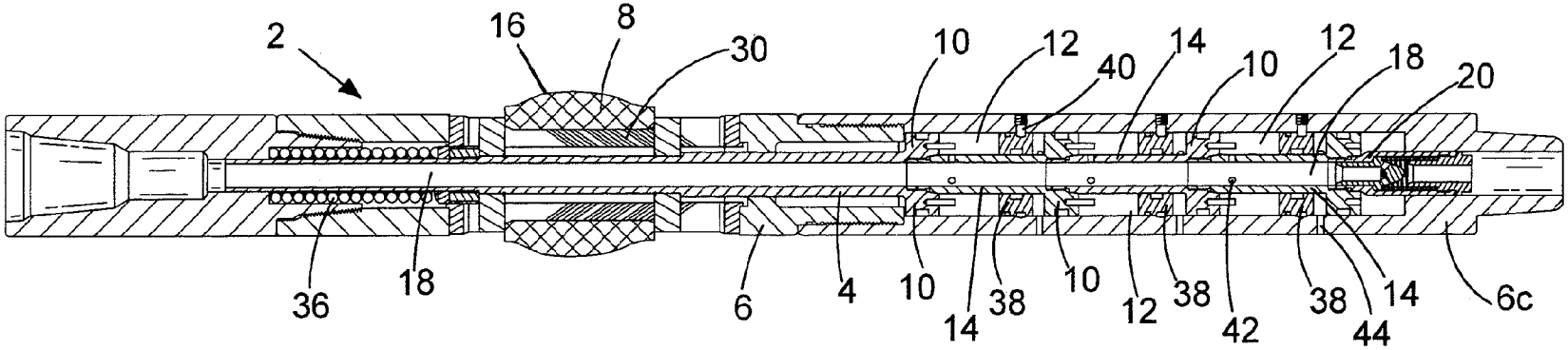
FIG. 1b is a longitudinal cross-sectional view of the perforating tool of FIG. 1a showing the cutter blocks in the outwardly deployed condition.
Figure 2A:
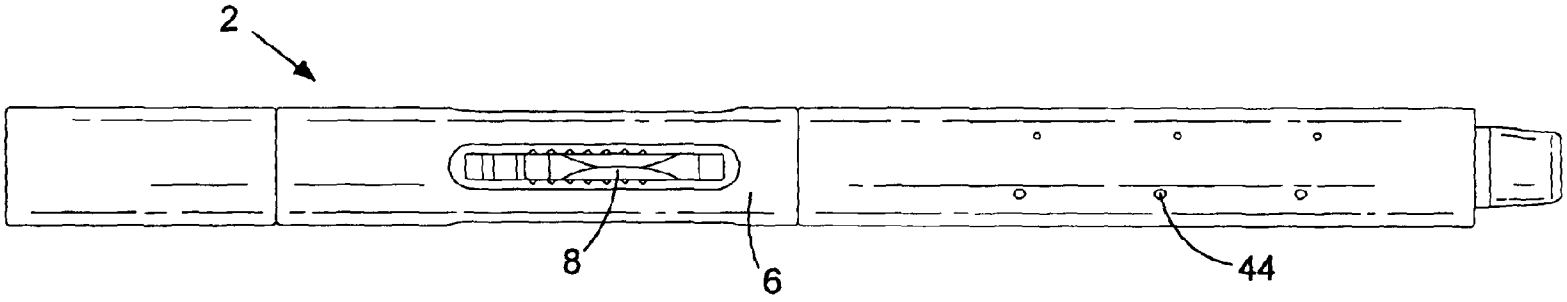
FIG. 2a is a side view of the perforating tool of FIGS. 1a and 1b showing the cutter blocks in the inwardly retracted condition.
Figure 2B:
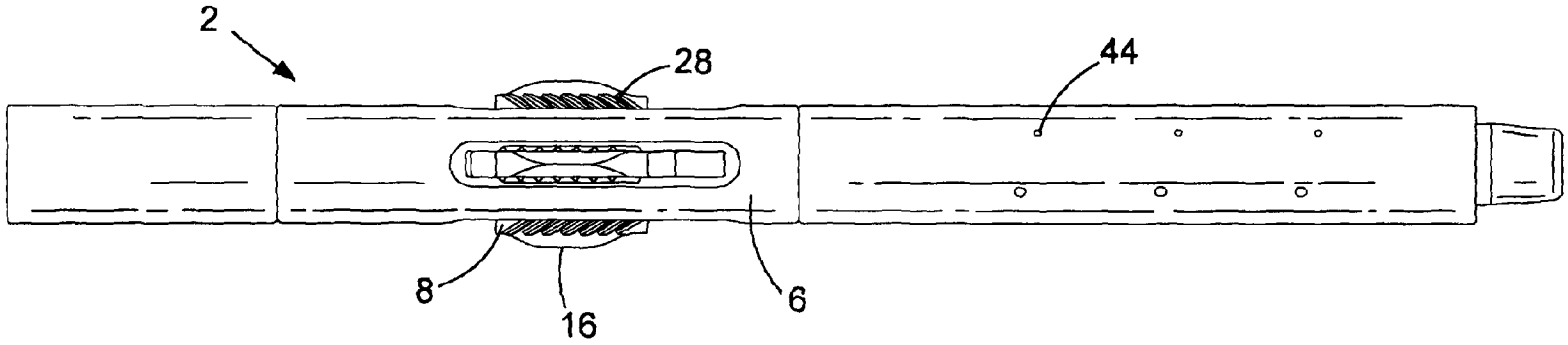
FIG. 2b is a side view of the perforating tool of FIGS. 1a and 1b showing the cutter blocks in the outwardly deployed condition.
Figure 3A:
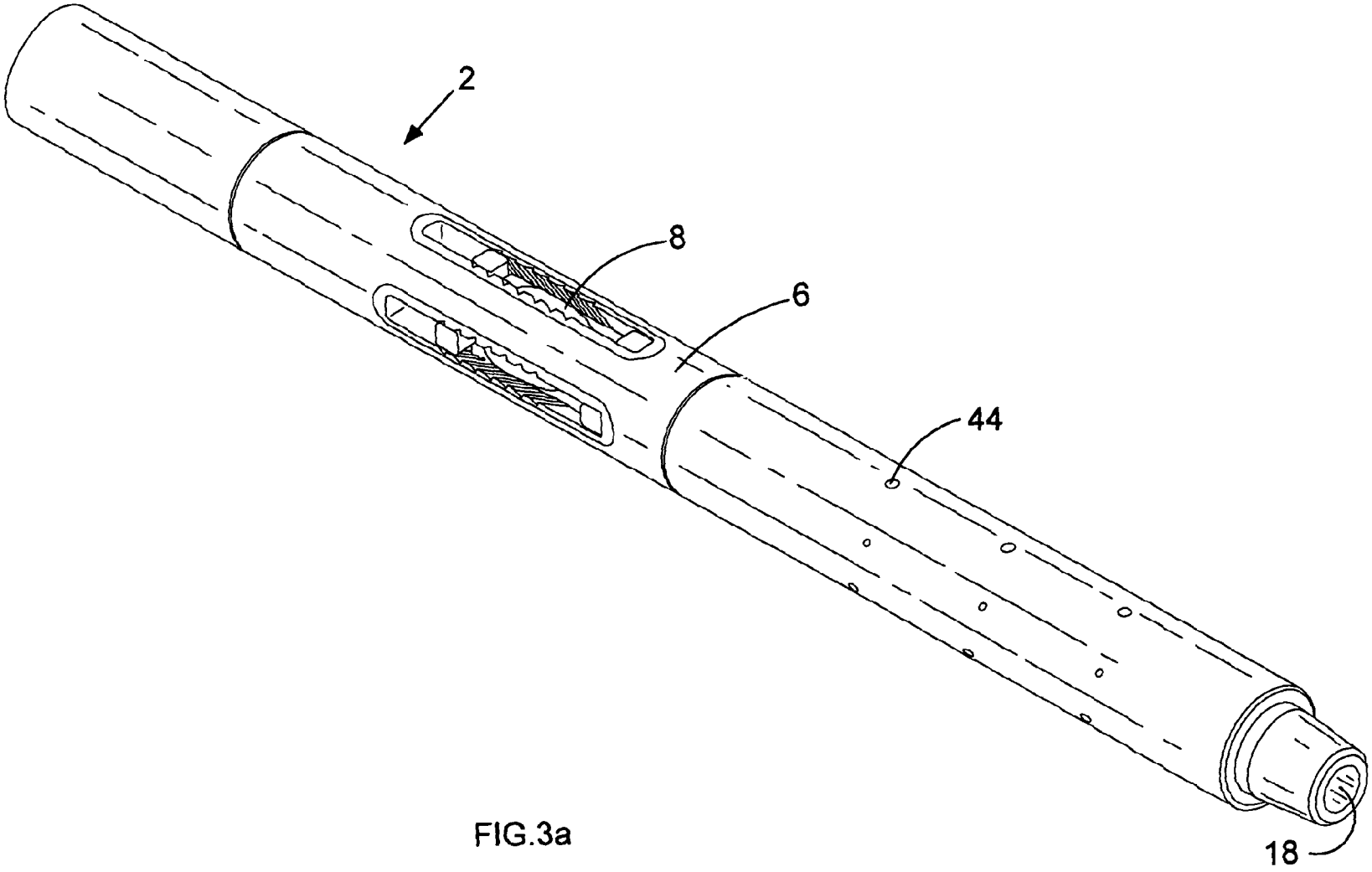
FIG. 3a is a perspective view of the perforating tool of FIGS. 1a and 1b showing the cutter blocks in the inwardly retracted condition.
Figure 3B:
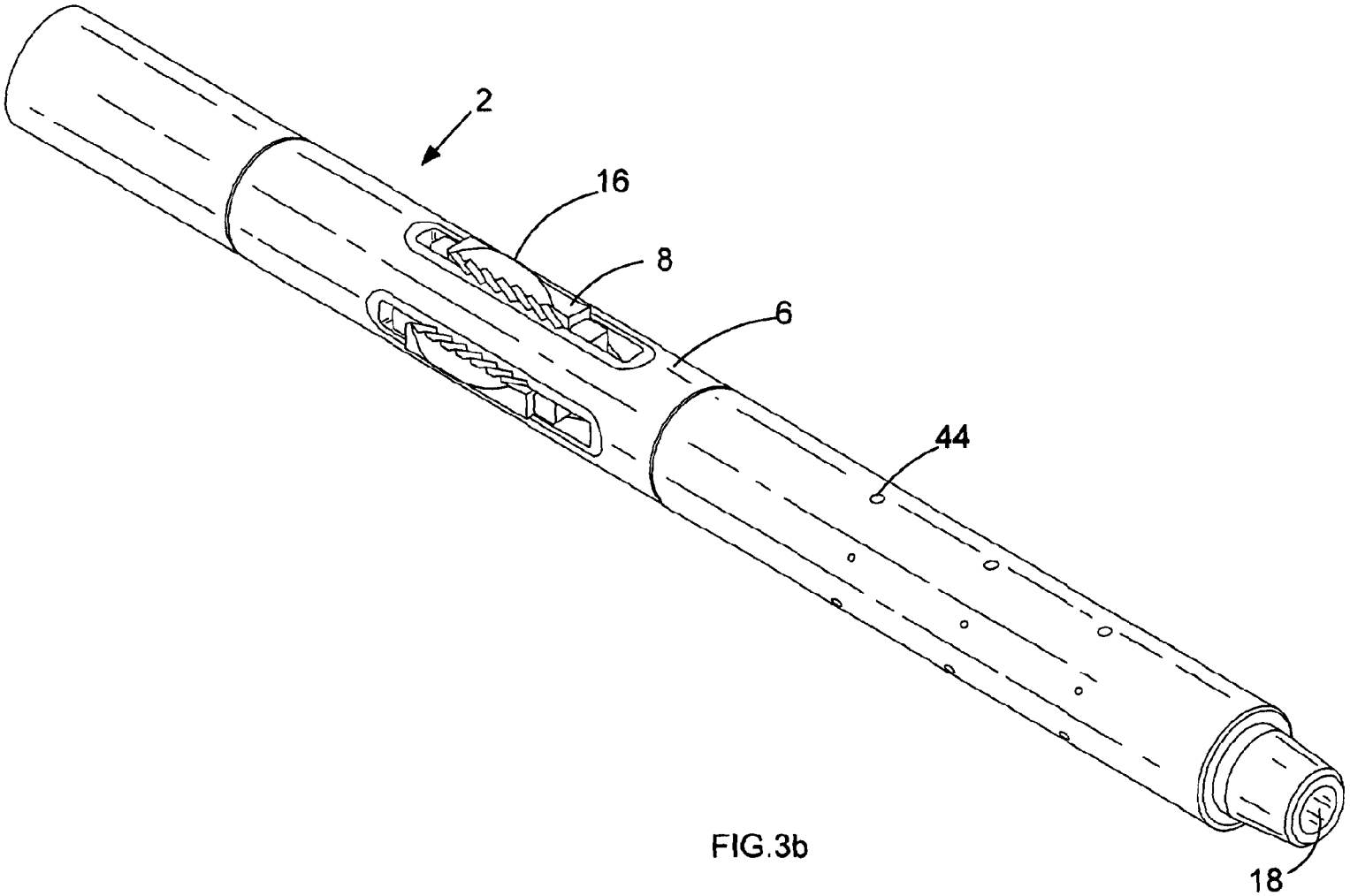
FIG. 3b is a perspective view of the perforating tool of FIGS. 1a and 1b showing the cutter blocks in the outwardly deployed condition.
Figure 4:
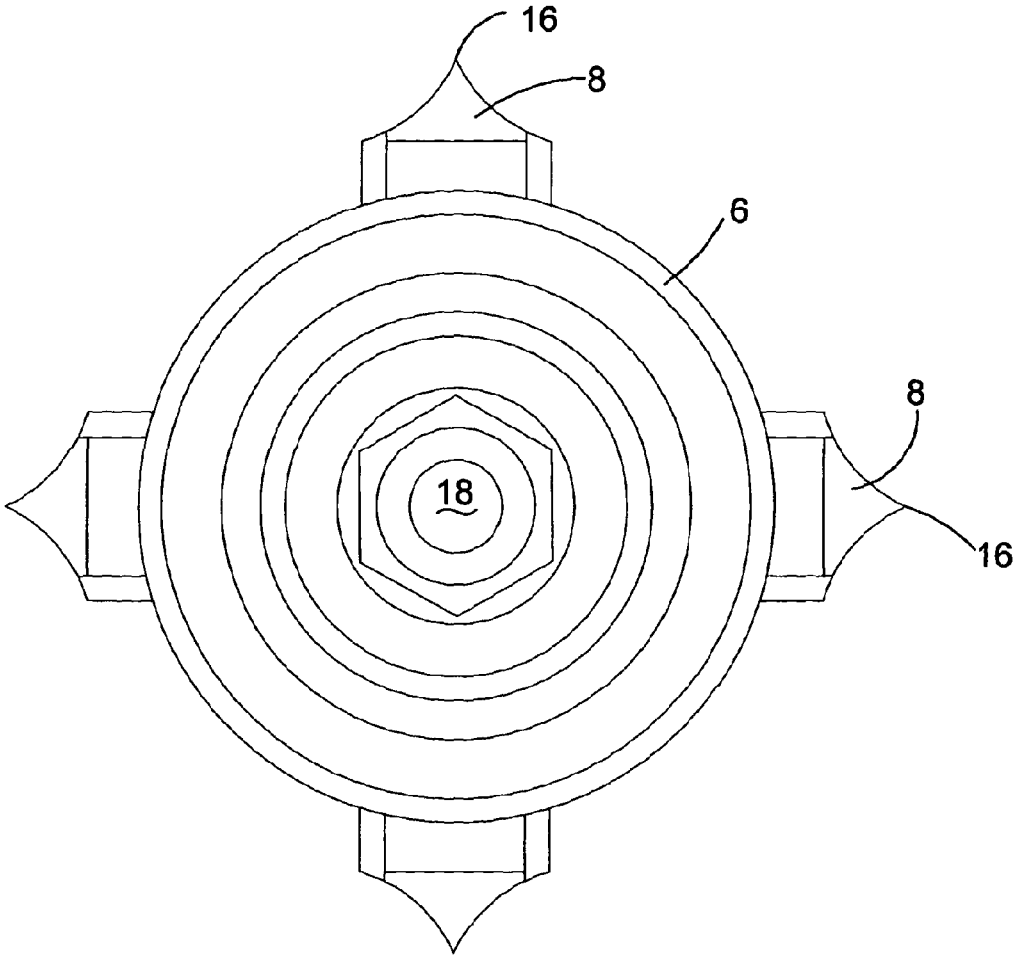
FIG. 4 is an end-on view of the perforating tool of FIGS. 1a and 1b showing the cutter blocks in the outwardly deployed condition.
Figure 10A:
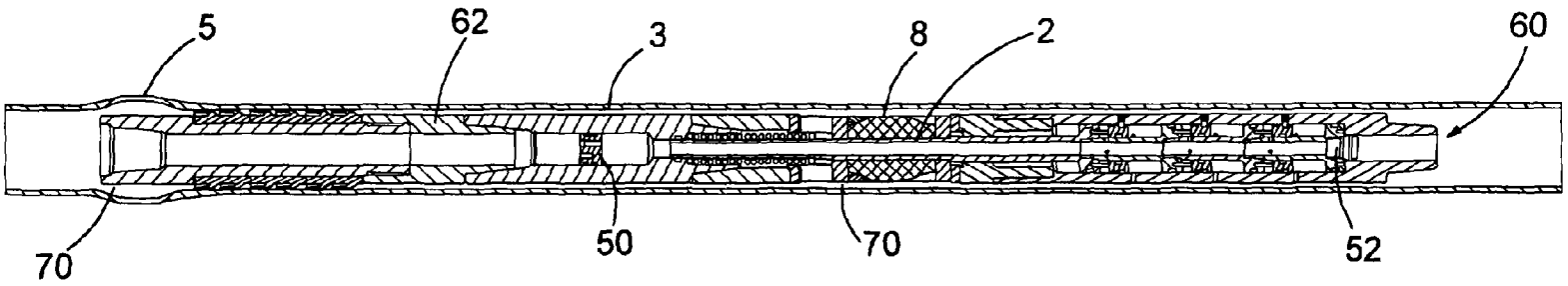
FIG. 10a is a longitudinal cross-section of a work string comprising the perforating tool of FIGS. 7a and 7b located below a cup tool in a perforated well casing.
Figure 10B:
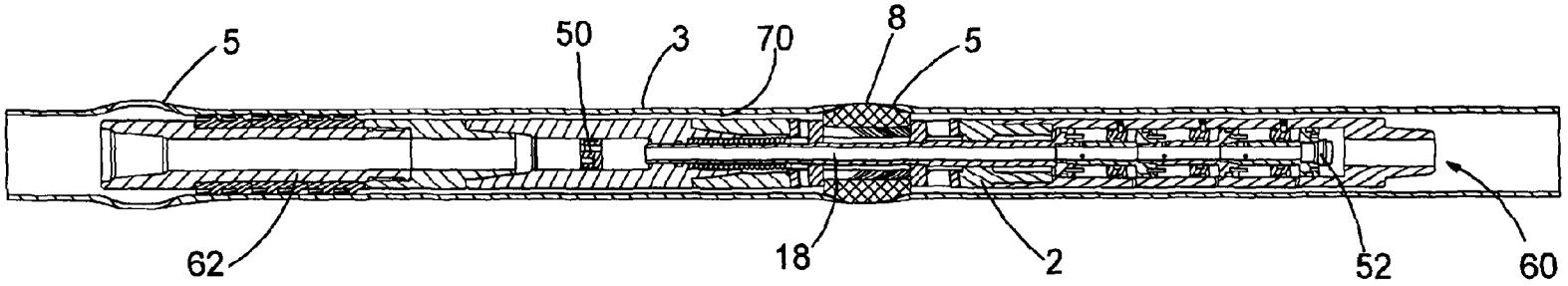
FIG. 10b is a longitudinal cross-section corresponding to FIG. 10a in which the cutter blocks are deployed outwardly to perforate the well casing and provide an anchor for the work string in the well casing.

Referring to FIGS. 1 to 4, a perforating tool 2 for perforating a downhole well casing 3 (FIGS. 10a and 10b)

comprises a body 6 arranged to be disposed in a well casing and at least one cutter block 8 moveable relative to the body between an inwardly retracted condition as shown in FIG. 1a and an outwardly deployed condition as shown in FIG. 1b to cut a perforation 5 (FIGS. 10a and 10b) in the well casing 3.

An activation member 4 is disposed in the body 6, wherein the activation member 4 is moveable relative to the body 6 to move at least one said cutter block 8 between the inwardly retracted condition and the outwardly deployed condition relative to the body. A plurality of pistons 10 is arranged to move the [4] activation member *4* relative to the body. Each piston 10 is disposed in a respective pressure chamber 12 arranged to be filled with fluid in response to an increase in fluid pressure in the body 6 to move each of the plurality of pistons relative to the body and cause the activation member 4 to move relative to the body.

The activation member defines a bore 18 disposed along a longitudinal axis of the body. A plurality of ports 42 are formed in the activation member to enable fluid to flow from the bore to each said pressure chamber such that an increase in fluid pressure in the body increases fluid pressure in each said pressure chamber to move each of the plurality of pistons relative to the body and cause the activation member to move relative to the body.

As will be familiar to persons skilled in the art, the body 6 is formed from a plurality of interconnected subs, 6a, 6b and 6c to form a perforating tool 2 that can be interconnected in a downhole work string. The activation member 4 comprises a mandrel interconnected with a plurality of lengths of tubing 14 interconnected with each respective piston 10. Tubing 14 forms a plurality of interconnected piston rods. In this way, the length of the activation member 4 can be modified although the activation member 4 and lengths of tubing 14 can be formed by a single length of tubing rather than a plurality of interconnected lengths of tubing.

Figure 5A:
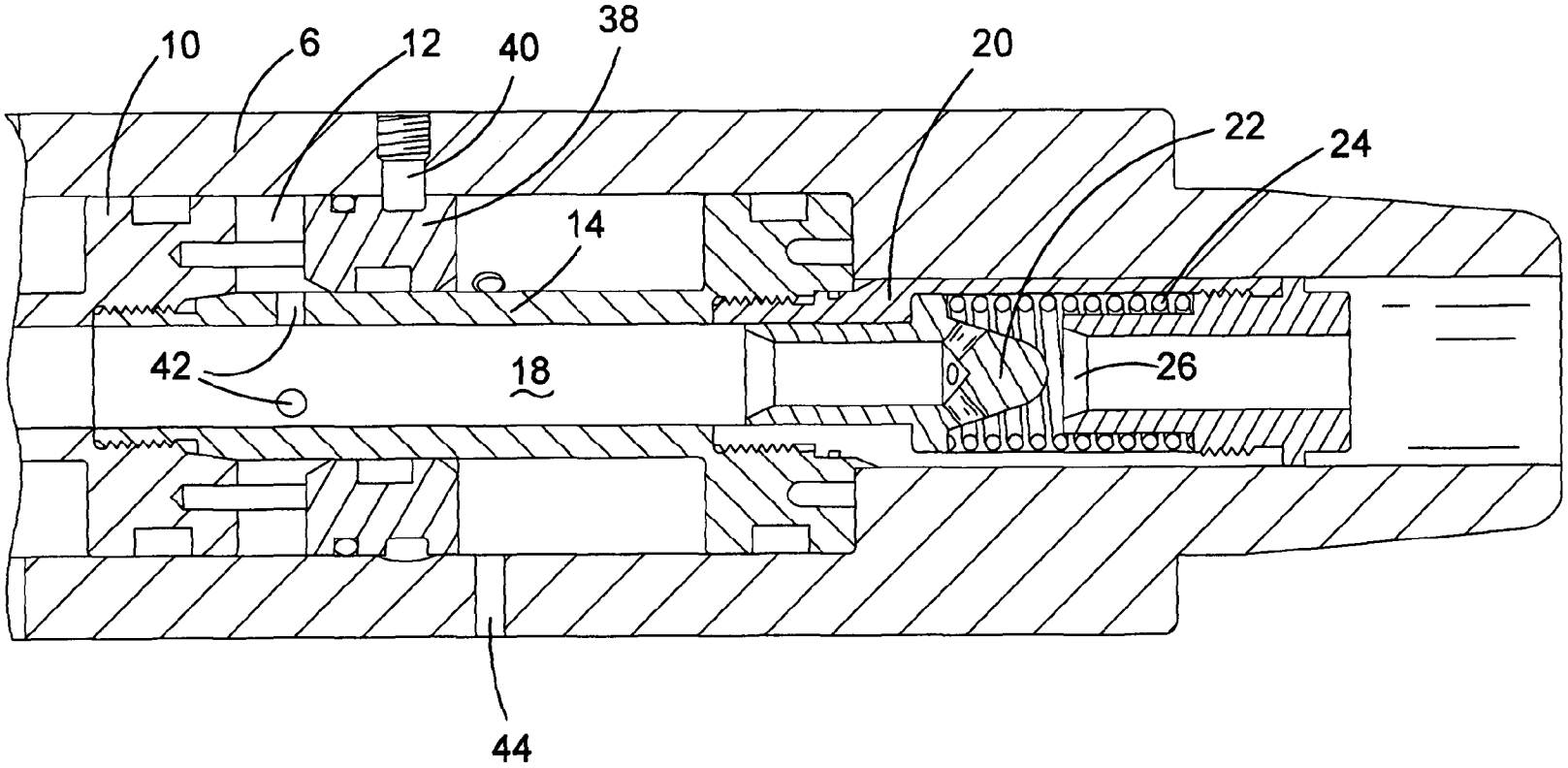
FIG. 5a is a longitudinal cross-sectional close-up of the valve assembly of the [a] perforating tool of FIGS. 1 to 4.
Figure 5B:
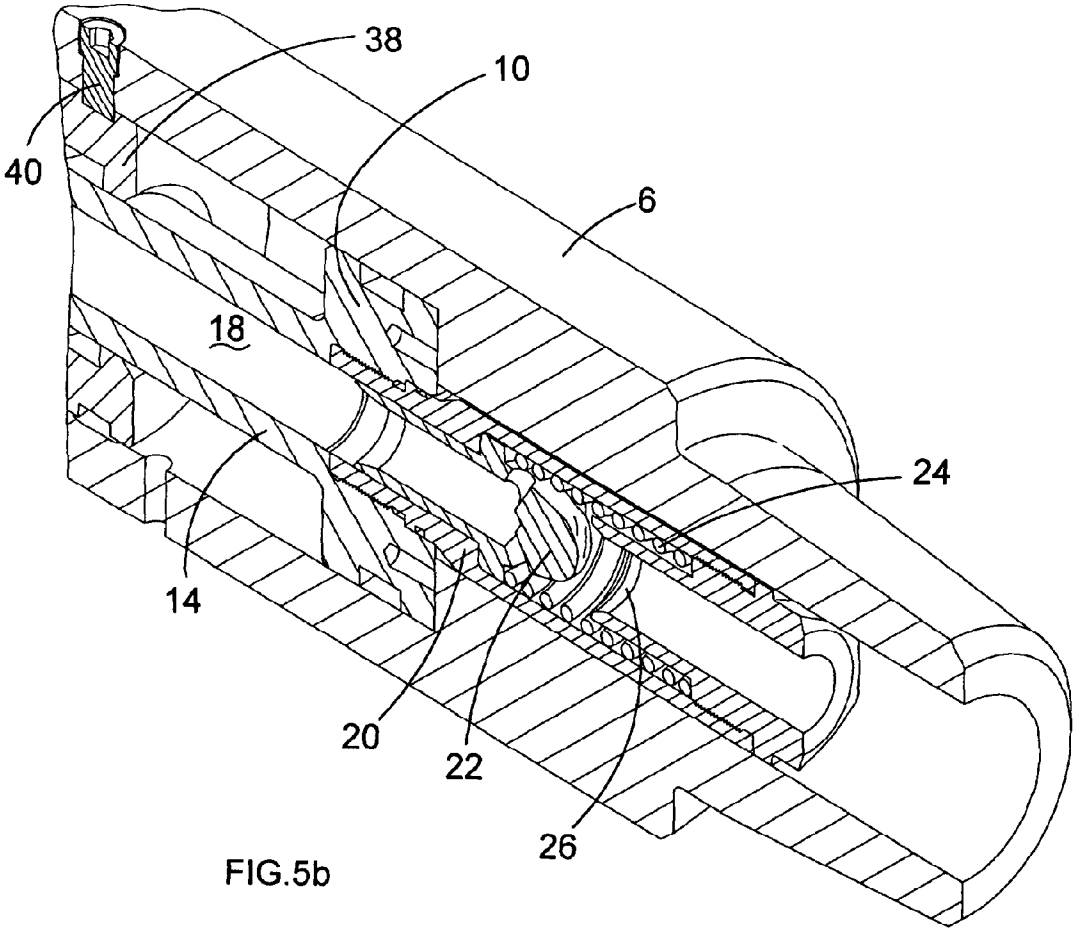
Figure 6A:
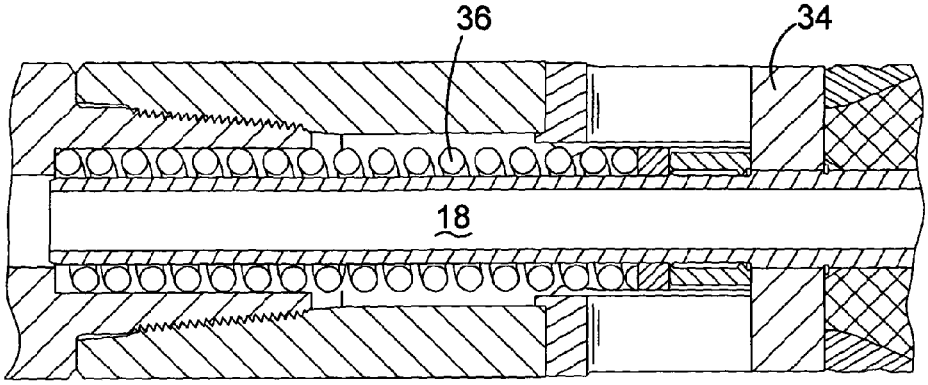
FIG. 6a is a longitudinal cross-sectional close-up of the return spring assembly and drive member of the perforating tool of FIGS. 1a and 1b.
Figure 6B:
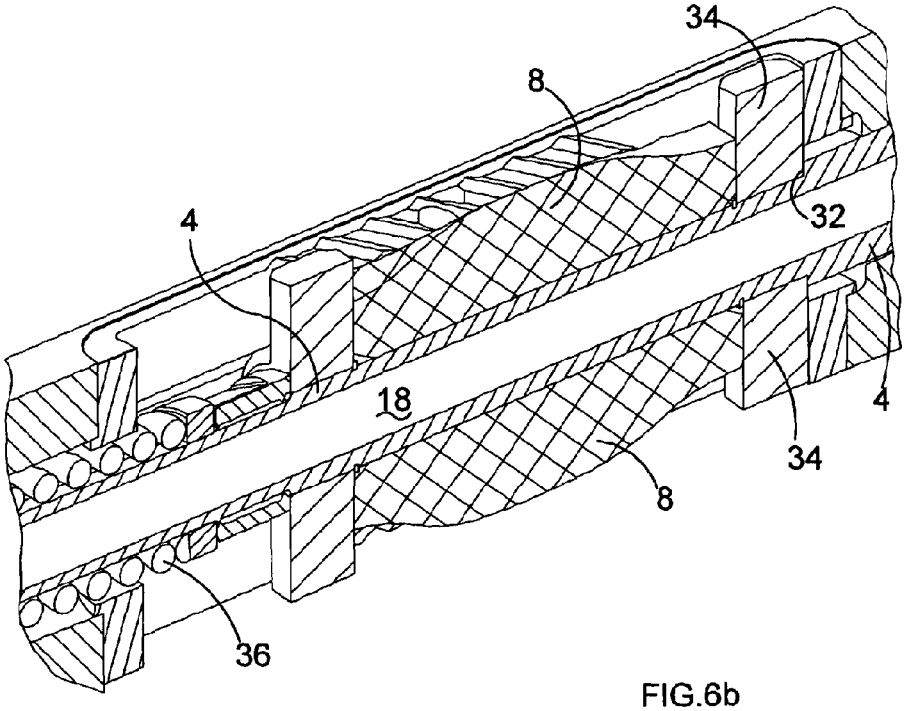

The activation member 4 defines a bore 18 disposed along the longitudinal axis of the body 6. The bore [8] *18* is arranged to be filled with fluid pumped from the surface when the tool 2 is disposed downhole in a well casing. In order to enable the bore 18 to be filled with fluid, a valve assembly 20 is disposed at the lowermost part of the tool 2. Referring to FIGS. 5a and 5b, the valve assembly 20 comprises a plunger 22 arranged to move against the bias of coil spring 24 to seal against valve seat 26 in response to an increase in fluid pressure in the tool. The valve is shown in the open condition in FIGS. 5a and 5b.

Cutter blocks 8 each have a respective sharp edge 16 which is arranged to be driven into a well casing to perforate the well casing. The cutter blocks or other working members 8 are provided with a plurality of inclined grooves 28 (FIG. 2b) which are slidable in a plurality of corresponding inclined grooves 30 (FIG. 1b) formed in the body 6. Respective inclined grooves 28 and 30 define an inclined track which enables the working member 8 to slide between the inwardly retracted and outwardly deployed conditions. Activation member 4 comprises a recess 32 in which a drive member 34 is located. Consequently, when the activation member 4 moves to the left in FIGS. 1a and 1b, the drive member 34 is moved leftwardly which pushes cutter block 8 to the left such that grooves 28 of cutter block 8 slide up grooves 30 of the body to move the cutter block 8 to the outwardly deployed condition to drive edge 16 into the well casing (not shown) to perforate the well casing.

A return spring 36 is provided to return the cutter block 8 to the inwardly retracted condition when fluid pressure is reduced in the bore 18. To further assist the cutter blocks to move back to the inwardly retracted condition, the inclined track 28, 30 is inclined relative to the longitudinal axis of the body such that pulling the tool 2 upwardly out of the well casing in which it is located pushes the cutter blocks 8 into the inwardly retracted condition.

Referring to FIGS. 1a, 1b and 5a, each pressure chamber 12 is defined at one end by piston 10 and at an opposite end by a stationary seal 38 that is fixed relative to the body 6 by threaded fasteners 40. Each pressure chamber 12 is in fluid communication with the bore 18 via a plurality of ports 42 formed in the tubing 14 which forms part of activation member 4. Consequently, when fluid pressure in bore 18 increases, fluid flows through ports 42 and into pressure chamber 12, pushing each piston 10 leftwardly as can be seen in moving from FIGS. 1a to 1b. A plurality of [annular] *annularly arranged* pressure ports are formed through the body 6 adjacent each pressure chamber 12 to enable the pistons to move relative to the body 6. In particular, fluid is exhausted through [annular] *annularly arranged* pressure ports 44 when the pistons move.

It can be seen from the drawings that each piston 10 is disposed concentrically around activation member 4, 14 and each pressure chamber defines an annular chamber arranged concentrically around the activation member. This provides a compact and convenient arrangement to increase the force available to the operator.

Referring to FIGS. 1 to 6 and 10, the operation of downhole tool 2 to perforate a well casing will now be described.

The downhole tool 2 is placed in a well casing 3 to be perforated with the cutter blocks 8 in the configuration in which they are inwardly retracted relative to the body 6 as shown in FIG. 1a. An operator on the surface then pumps fluid down the string in which the downhole tool 2 is located, such that fluid moves into bore 18. This drives plunger 22 of valve assembly 20 against seat 26. The bore 18 therefore fills with fluid and the pressure of the fluid increases in response to further pumping from the surface.

This causes fluid 18 to move through ports 42 and into pressure chambers 12. When the pressure in chambers 12 increases, pistons 10 are driven to the left or upwardly in relation to the well bore which moves activation member 4, drive member 34 and pushes the cutter member 8 along tracks 30 to the outwardly deployed condition as shown in FIG. 1b. This drives edge 16 into the inner surface of the well casing to perforate the well casing. If each of the pistons 12 has two square inches of area, by using four pressure chambers 12 as shown, the tool 2 has eight square inches of area and this creates enough force to push the activation member 4 cutter block 8 out to cut or perforate the casing.

When fluid pressure is removed, return spring 36 pushes activation member 4 and therefore pistons 10 downwardly to return the working members 8 to the inwardly retracted position. Alternatively, the tool 2 could be used without a return spring 36 because the action of pulling the tool 2 out of the well casing would return the cutter blocks 8 to the inwardly retracted condition.

Figure 7A:
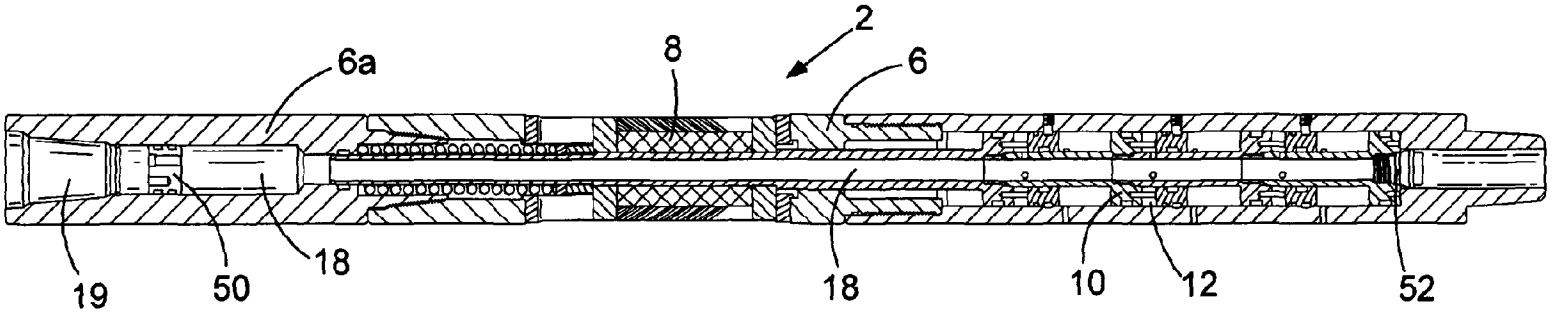
FIG. 7a is a longitudinal cross-section of the perforating tool of FIG. 1a comprising a floating piston.
Figure 7B:
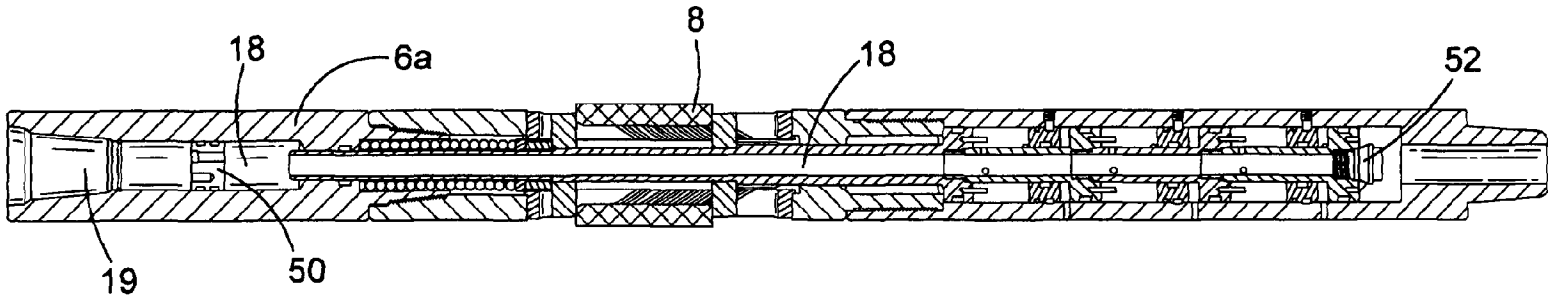
FIG. 7b is a longitudinal cross-section corresponding to FIG. 7a showing the movement of the floating piston to deploy the cutter blocks.

Referring to FIGS. 7a and 7b, a further improvement can be made to perforating tool 2 by the addition of a floating piston 50 disposed in the upper part of bore 18. The upper part of bore 18 is disposed in top sub 6a. A plug 52 is mounted at the lowermost extent of bore 18. This effectively seals the bottom end of the bore 18. Bore 18 is also filled with oil or another working fluid and movement of floating piston 50 downwardly as shown in moving from FIGS. 7a to 7b increases the pressure of the oil in bore 18 to cause the cutter blocks to move outwardly in the manner described above. In the upper portion 19 of the bore, a different fluid is used to apply pressure to floating piston 50. By providing oil in bore 18, sealed at one end by plug 52 and at the other end by floating piston 50, the internal diameter of the tool 2 can be kept clean. This also helps to prevent debris from moving into the working parts of the perforating tool 2.

Referring to FIGS. 10a and 10b, a downhole work string 60 is located in a well casing 3 and comprises a perforating tool 2 as described above and a cup tool 62 as shown in FIGS. 8 and 9. The perforating tool 2 comprises a floating piston 50 to increase oil pressure in bore 18.

Figure 8:
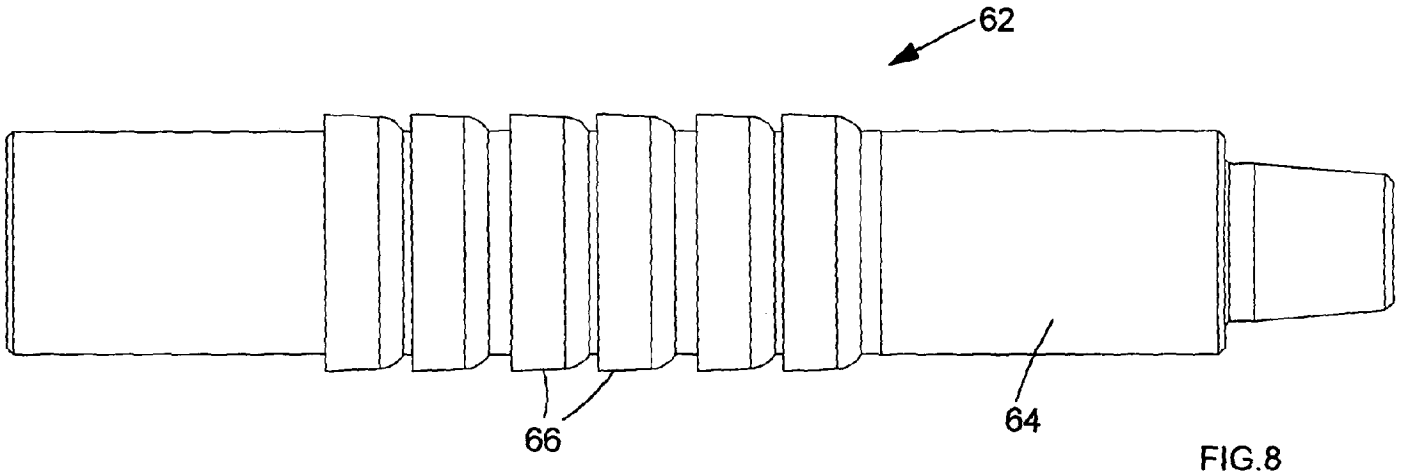
FIG. 8 is a side view of a cup tool.
Figure 9:
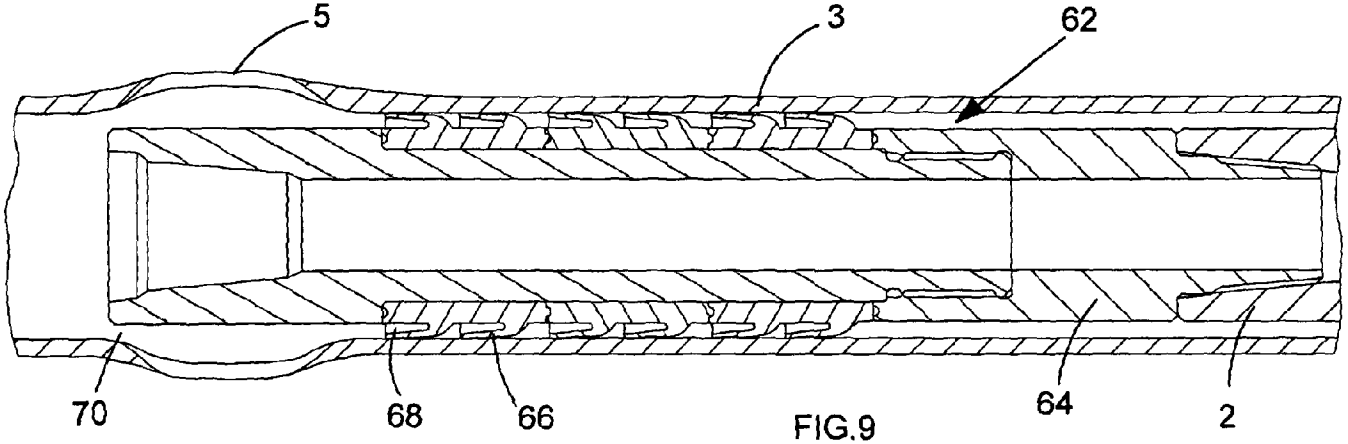
FIG. 9 is a longitudinal cross-section of a perforated well casing showing the cup tool of FIG. 8 disposed in a work string.

Referring to FIGS. 8 and 9, cup tool 62 is formed from a work string sub 64 to which a plurality of annular elastomeric cup elements 66 is mounted. Cup elements 66 define recesses 68 into which hydraulic fracturing fluid is forced under pressure to form an annular seal between the cup elements 66 and casing 3. The interconnection of downhole work string elements will be familiar to persons skilled in the art and will not be described in any further detail herein.

Referring to FIGS. 8 to 10b, a method of completion of a hydrocarbon well using a work string comprising perforating tool 2 and cup tool 62 will be described. Firstly, the work string is lowered down a well in which casing 3 has been installed. A perforating operation is conducted which comprises increasing pressure on floating piston 50 from the surface to repeatedly deploy cutter blocks 8 outwardly to punch perforations 5 in the well casing 3. The work string is lowered in steps to punch perforations 5 along a length of casing 3.

When the perforation operation has been completed, the formation behind the perforations 5 must be fractured in order to enable production of oil and gas from the well. To accomplish this, fracturing fluid is pumped down the annulus 70 defined by the outside of the work string. The fracturing fluid sits in recesses 68 of the cup elements 66 of the cup tool 62 to form a seal. The fracturing fluid is therefore pumped under pressure through perforations 5 to cause fracturing of the formation in which casing 3 is located. The perforation and fracturing operations can be repeated by perforating a section of casing and then subsequently lowering the cup tool past the perforations and conducting an annular pumping of fracturing fluid.

It should also be noted that when fracturing fluid is pumped under pressure, the floating piston 50 will be moved downwardly to deploy cutter blocks 8 and perforate casing 3. This forms an anchor by means of the cutter blocks 8 anchoring in the casing 3. This condition is shown in FIG. 10b.

Figure 11:
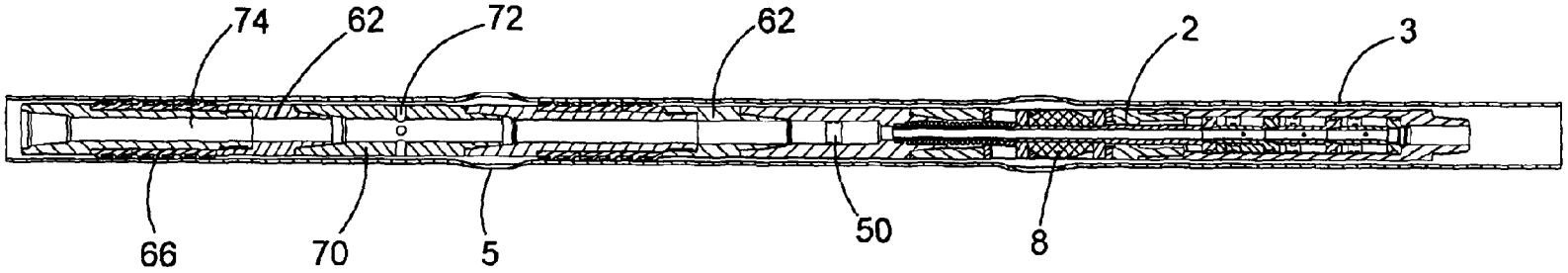
FIG. 11 is a longitudinal cross-section of a work string using two cup tools to enable hydraulic fracturing to be performed through the internal diameter of the work string.
Figure 13:
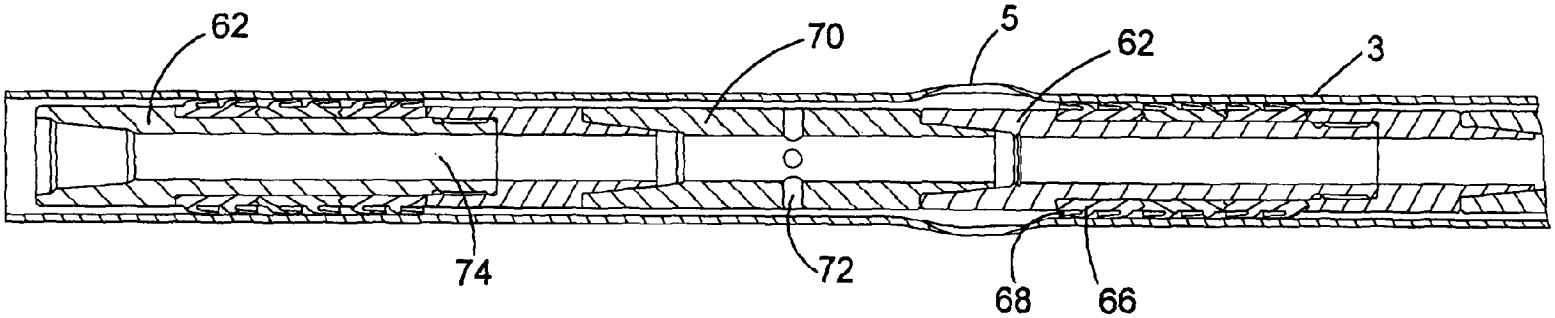
FIG. 13 is a longitudinal cross-section corresponding to FIG. 12.
Figure 12:
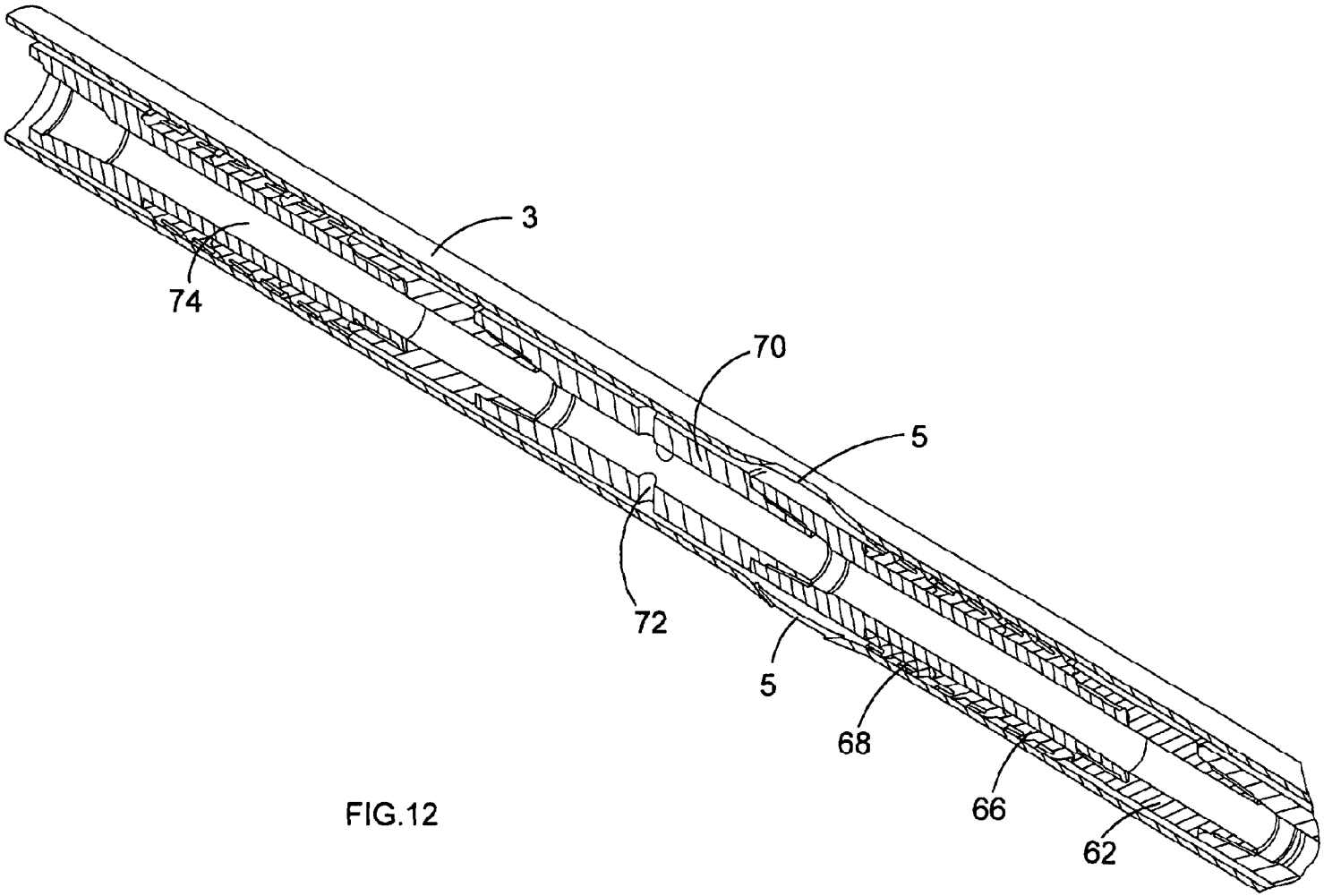
FIG. 12 is a cross-sectional perspective close-up view of the two cup tools located in the work string of FIG. 11.

Referring to FIG. 11, an alternative example of a work string comprises perforating tool 2 mounted in a work string in which two cup tools 62 are mounted above and below a ported sub 70 comprising a plurality of annular ports 72. Operation of the work string of FIGS. 11 to 13 is similar to that of the work string of FIGS. 10a and 10b with the following differences. Once the perforation operation has been completed by perforating tool 2, the work string is lowered such that one or more perforations 5 in casing 3 are located between the cup elements 66 of respective cup tools 62. Fracturing fluid is then pumped down the internal bore 74 of the string to exit port 72 under pressure and fracture the formation behind perforations 5. Respective cup tools 62 provide seals above and below ports 72 to isolate a section of casing 3.

Packer Apparatus

Referring to FIGS. 14a to 16b, packer apparatus 102 comprises a body 106 arranged to be disposed in a well casing. An activation member 104 is mounted to body 106 wherein the activation member is moveable relative to the body to deform an elastomeric packer element 108 outwardly relative to the body to form an annular seal in a well casing in use.

A plurality of pistons 110 are arranged to move activation member 104 relative to the body. Each piston defines a respective pressure chamber 112 arranged to be filled with fluid in response to an increase in fluid pressure in the body 106 to move each of the plurality of pistons 110 relative to the body 106 and cause the activation member 104 to move relative to the body.

It can be seen that the body 106 comprises a cylindrical member having an internal bore 118 arranged to receive fluid under pressure. Each piston 112 is mounted concentrically on the body 106. A plurality of ports 142 are formed through body 106 to enable fluid to flow from bore 118 into pressure chambers 112.

It can therefore be seen that each pressure chamber 112 defines an annular chamber arranged concentrically around body 106. This configuration enables more pistons [112] *110* to be mounted to the body 106 if required to increase the force available to the operator. Respective stationary seal rings 138 define the opposite ends of pressure chambers 112. The configuration of the packer apparatus 102 enables the outer housing of the apparatus to be energised by fluid under pressure rather than an internal mandrel in the manner of the perforating tool of FIGS. 1a and 1b. A plurality of [annular] *annularly arranged* pressure ports 144 are provided to enable fluid in the well bore to escape to allow pistons 112 to operate.

Figure 14A:
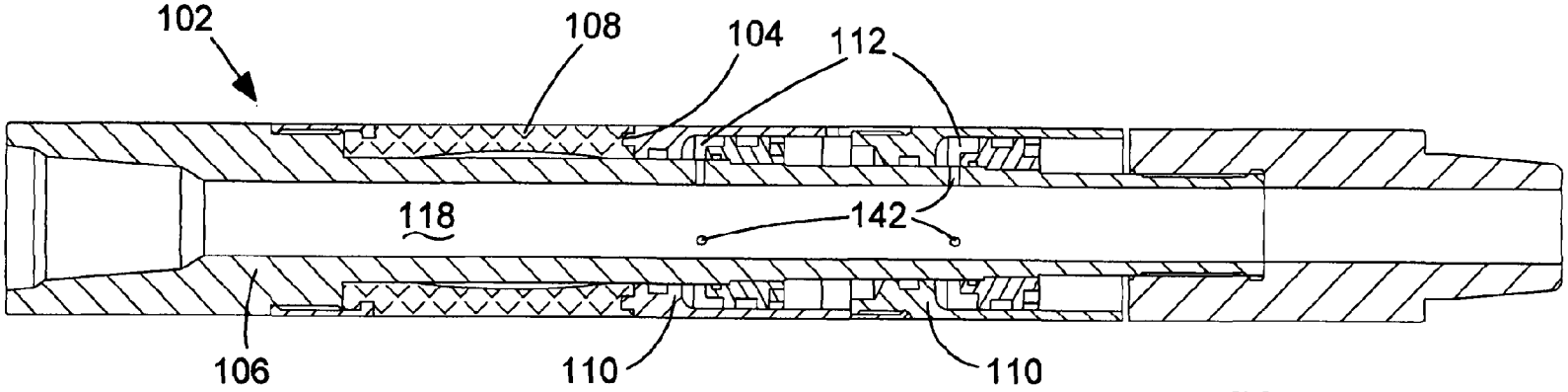
FIG. 14a is a longitudinal cross-section of a packer apparatus for providing an annular seal in a well casing in which the elastomeric packer element is shown in the undeformed condition.
Figure 14B:
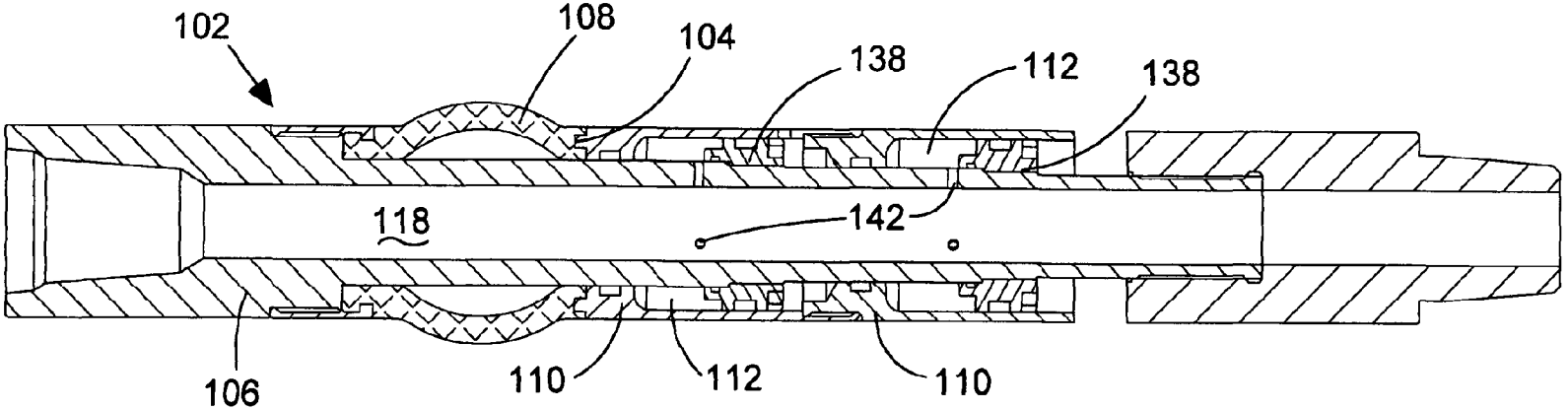
FIG. 14b is a longitudinal cross-section of the packer apparatus of FIG. 14b in which the packer element is deformed outwardly.
Figure 15A:
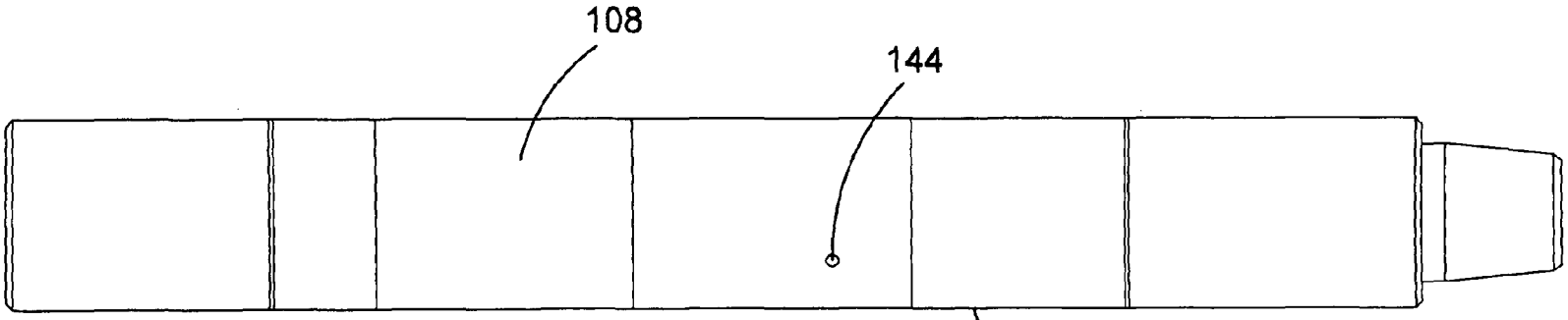
Figure 15B:
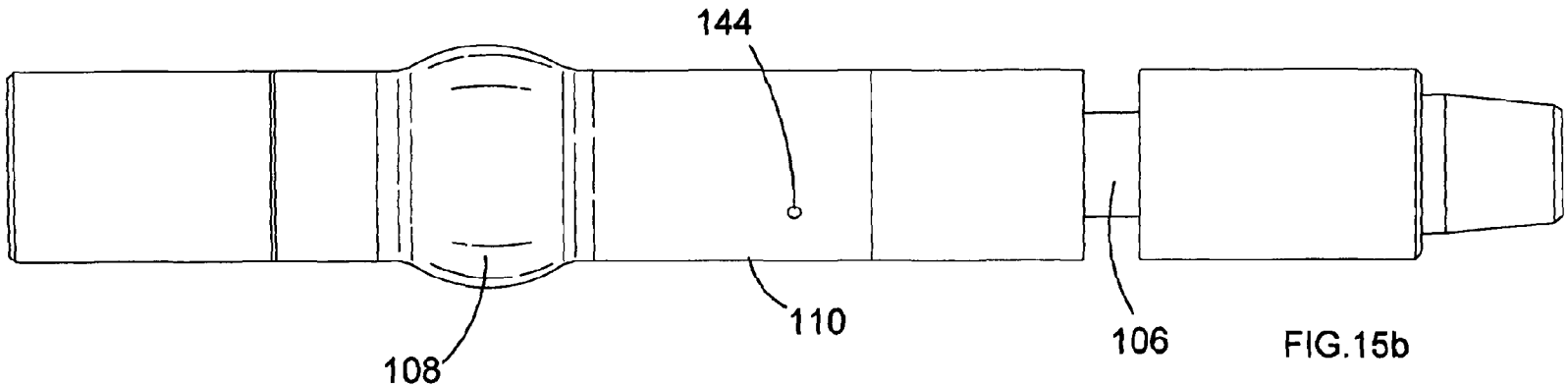
FIG. 15b is a side view of the packer apparatus in the condition of FIG. 14b.
Figure 16A:
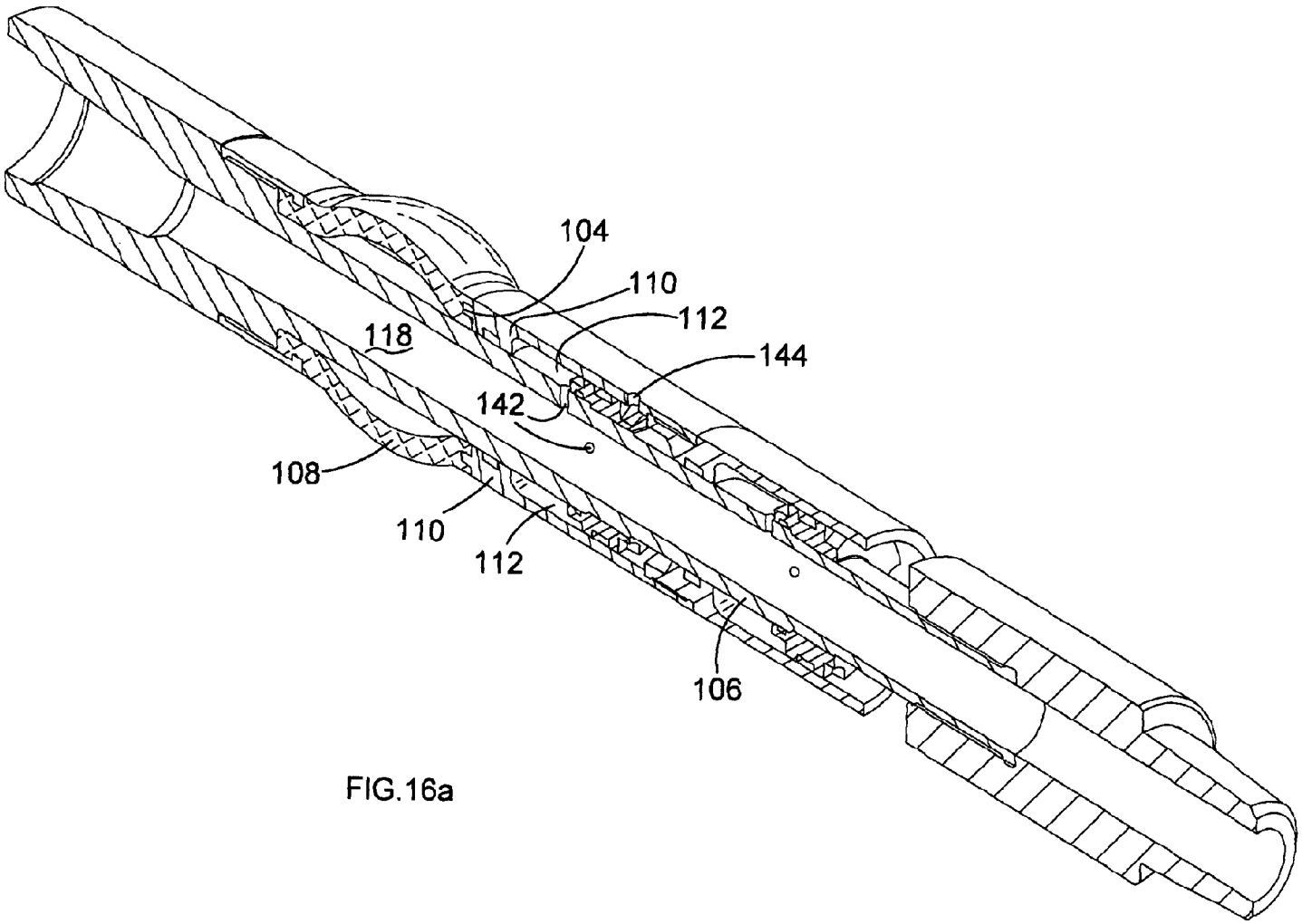
Figure 16B:
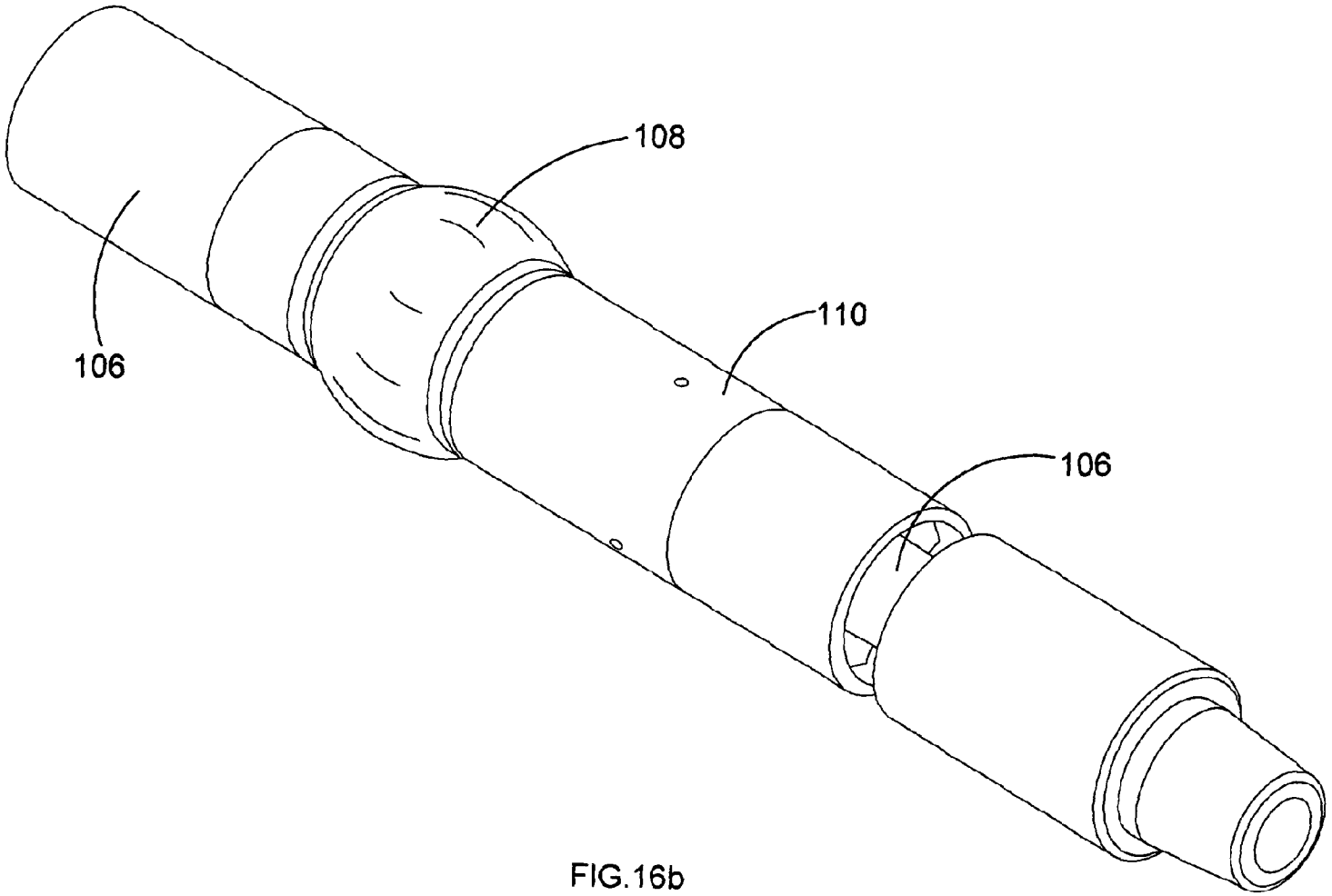
FIG. 16b is a perspective view of the packer apparatus showing the packer element deformed outwardly.

In order to deform elastomeric packer element 108 outwardly to form a seal in a well casing, fluid is pumped under pressure down bore 118. This causes the fluid to move through ports 142 and into pressure chambers 112. This pushes pistons 110 upwardly along body 106 causing activation member 104 to deform the elastomeric packer element 108 outwardly. When the fluid pressure is removed from bore 118, a return spring (not shown) or the action of pulling packer 102 out of the well casing will return the packer element 108 to the undeformed condition as shown in FIG. 14a.

Figure 20A:
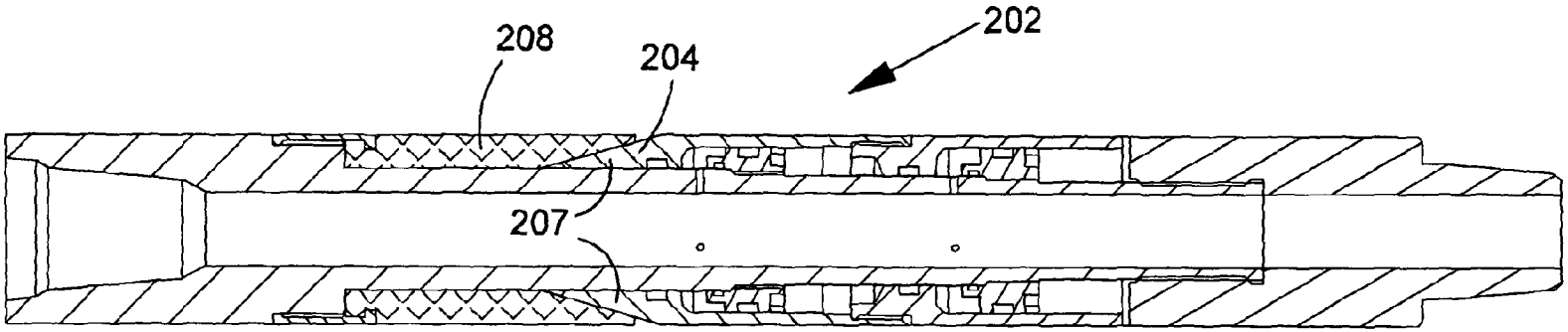
FIG. 20a is a longitudinal cross-sectional view of a second embodiment of a packer apparatus.
Figure 20B:
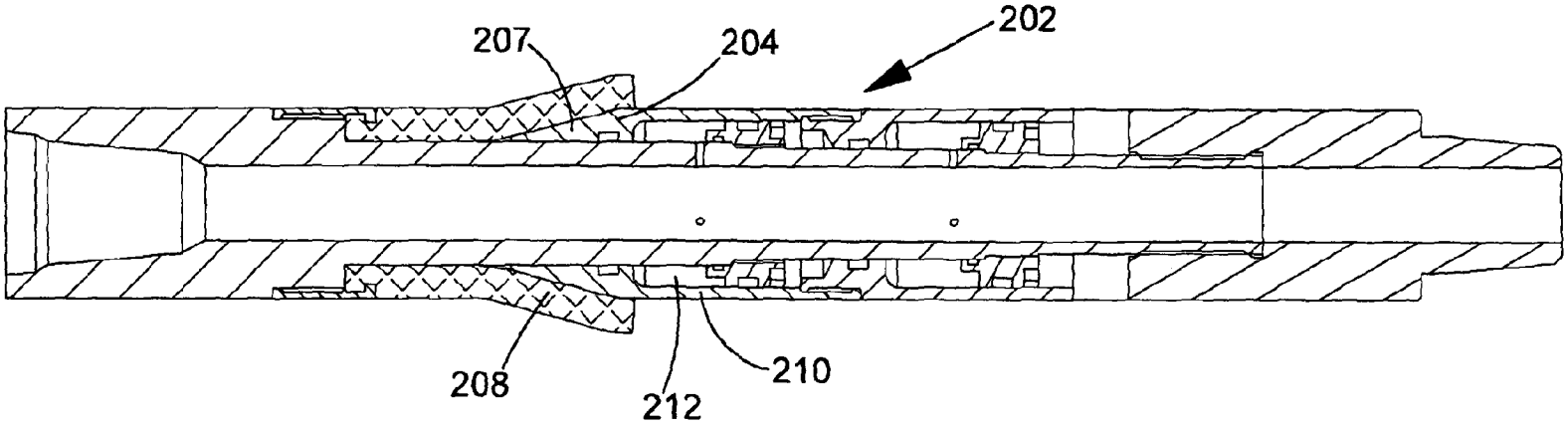
FIG. 20b is a longitudinal cross-sectional view of a packer apparatus of FIG. 20a showing the packer element deformed outwardly.
Figure 21:
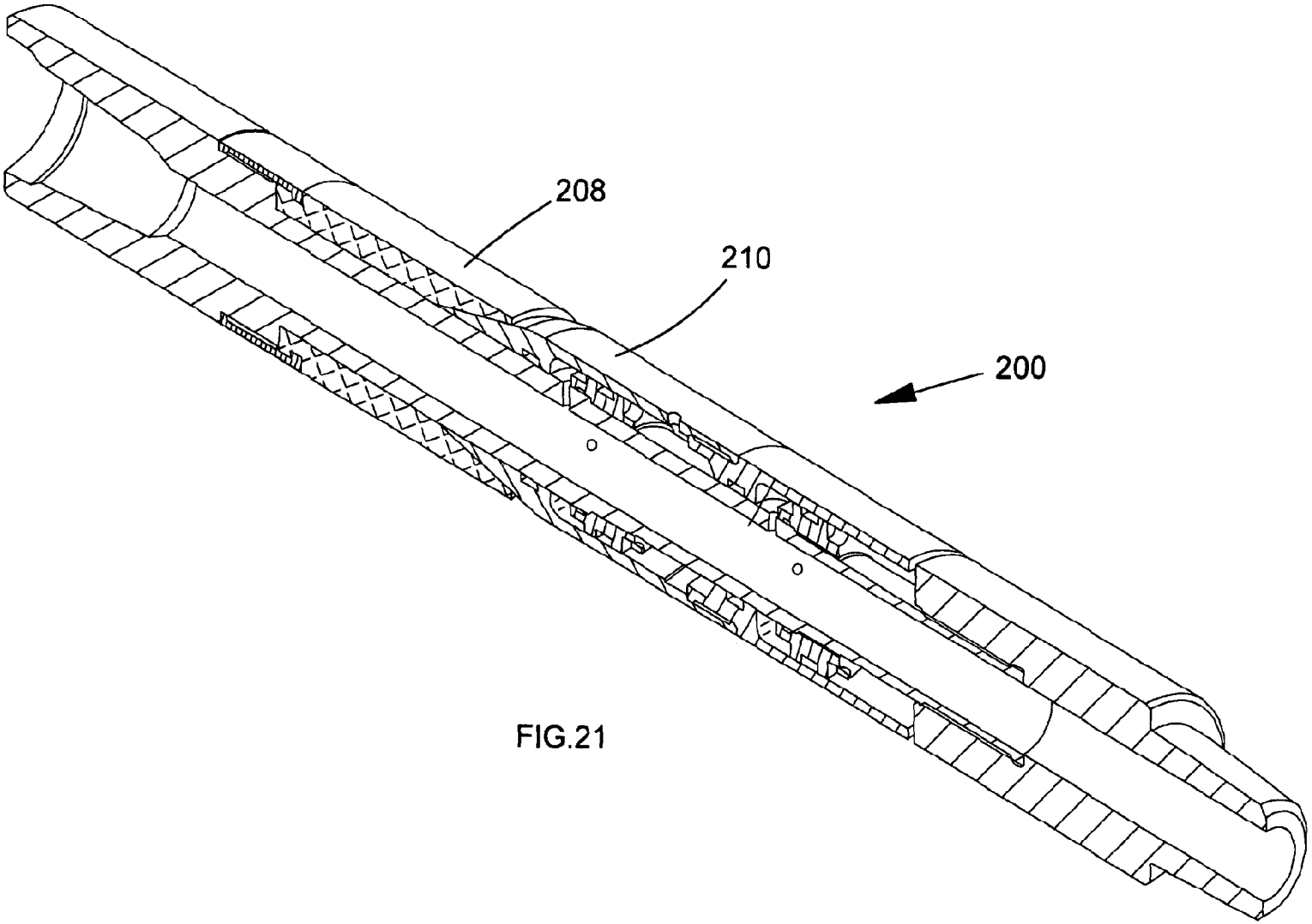
Figure 22:
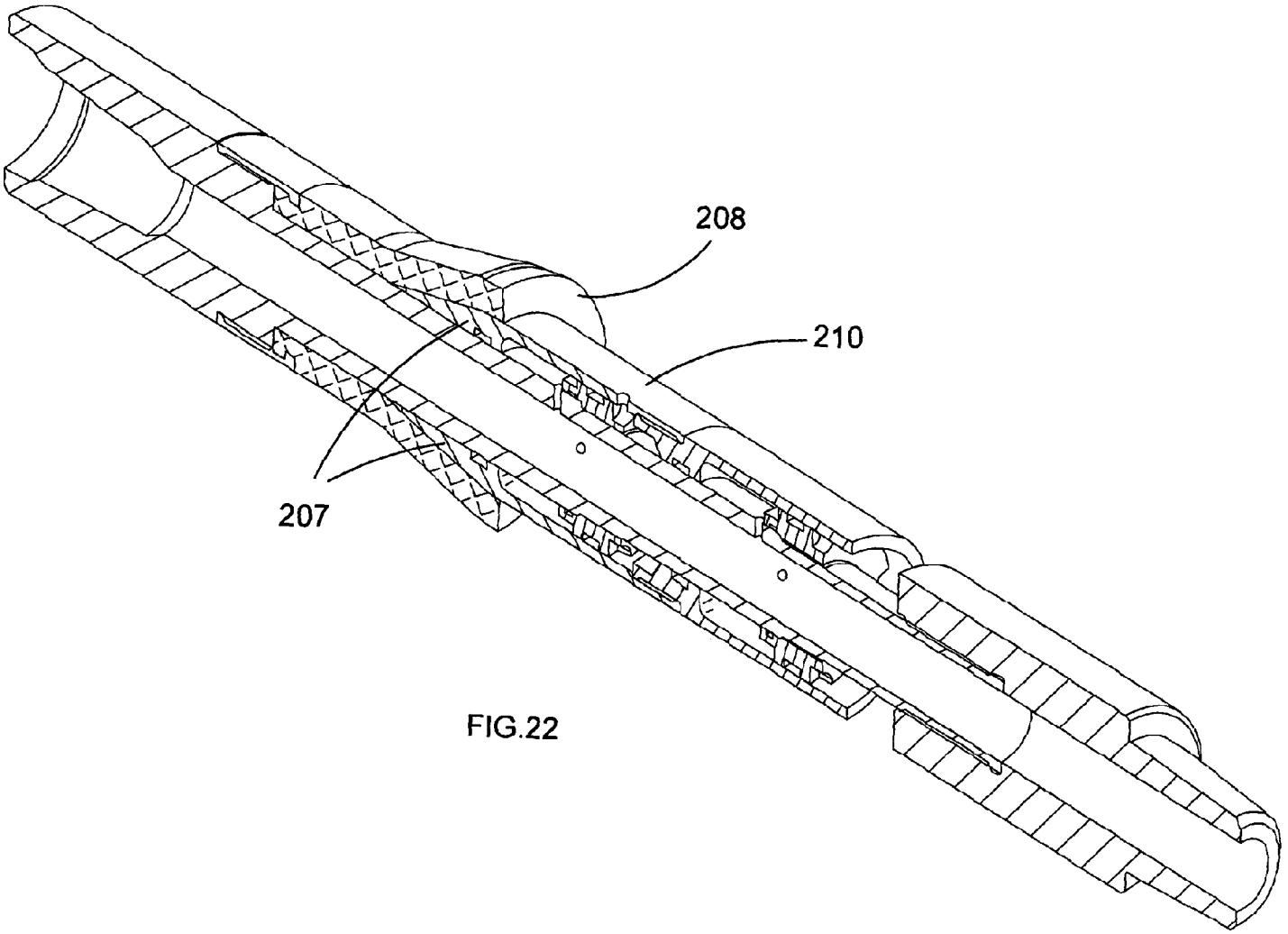
FIG. 22 is a perspective cross-section corresponding to FIG. 20b.

An alternative embodiment of the packer apparatus is shown in FIGS. 20 to 22. Packer apparatus 202 comprises an activation member 204 having a ramp portion 207. Ramp portion 207 is mounted to piston 210 comprising pressure chamber 212. The activation of piston 210 is achieved in the same manner as the packer apparatus 102 and will not be described in any further detail herein. It can be seen that the ramp 207 protrudes under the elastomeric deformable packer element when activated to push the packer element 208 outwardly.

Figure 17:
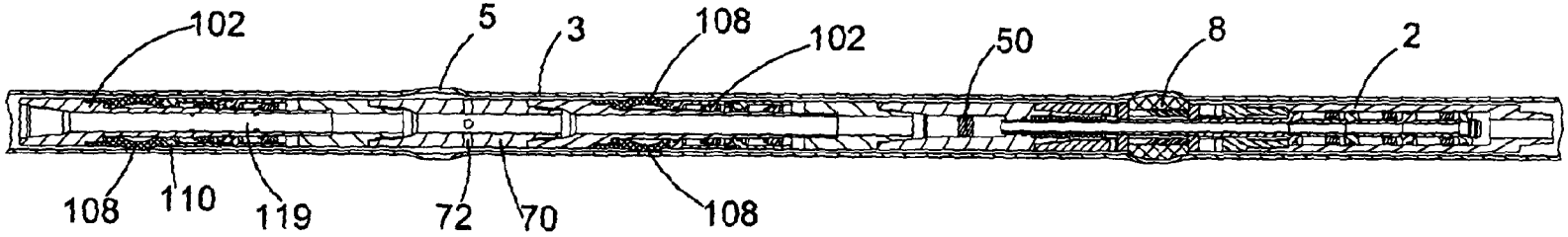
FIG. 17 is a longitudinal cross-section of a work string in which the perforating tool of FIGS. 7a and 7b and two packer apparatuses of FIGS. 14 to 16 are incorporated.
Figure 18:
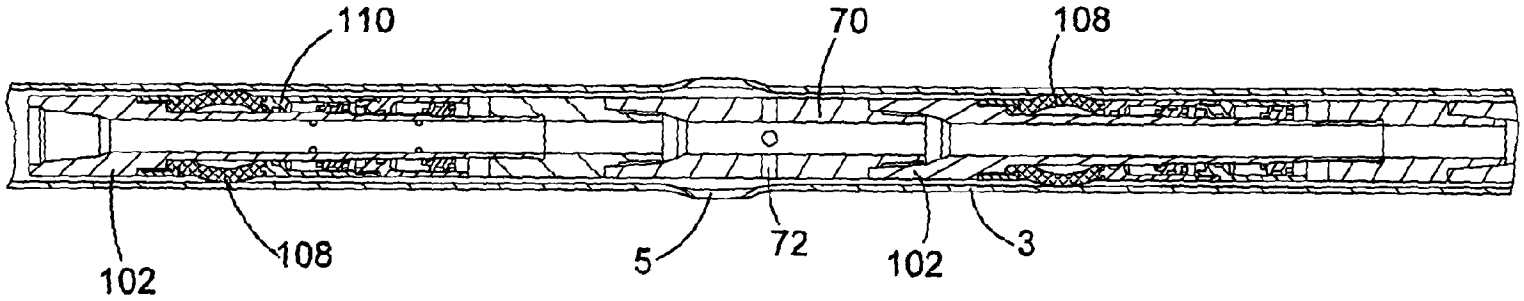
FIG. 18 is a longitudinal cross-sectional view of the packer apparatuses of the work string of FIG. 17 showing a ported sub for use in fracturing operations.

Referring to FIGS. 17 to 19, a downhole work string usable in completion of a hydrocarbon well incorporating perforating tool 2 and two packer apparatuses 102 is shown. The work string also comprises a ported sub 70 having ports 72 to allow fracturing fluid to be pumped through perforations 5. By pumping fracturing fluid under pressure along bore 119, floating piston 50 is actuated and also pistons 110 of packer apparatuses 102 to cause outward deployment of packer seal element 108. This enables a fracturing operation to be conducted on an isolated portion of casing between packer elements 108 which form annular seals.

Figure 19A:
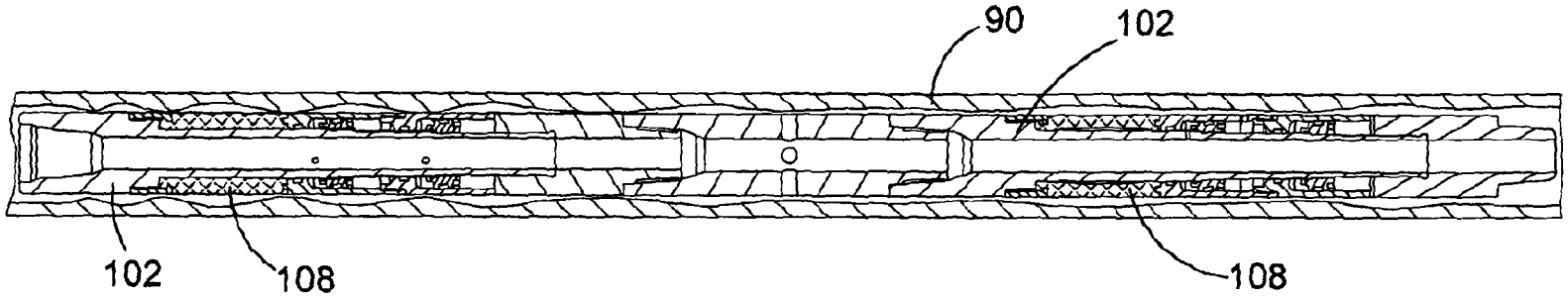
FIG. 19a is a longitudinal cross-sectional view of a section of work string [user] *using* two packer apparatuses in a well drilled in an open formation.
Figure 19B:
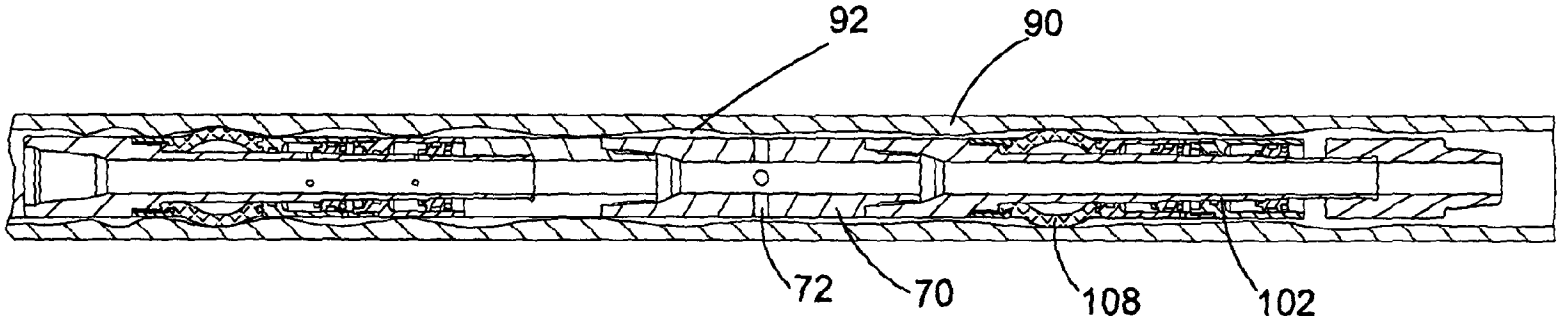
FIG. 19b is a longitudinal cross-sectional view corresponding to FIG. 19a in which the packer elements are deformed outwardly to form a seal in the open formation.

Referring to FIGS. 19a and 19b, packer apparatuses 102 are also particularly suited for use in open formation 90. Elastomeric deformable packer elements 108 are suited to forming a seal in the internal undulating surface 92 of open formation borehole 90. Ported sub 70 can then be used to conduct a fracturing operation of open formation borehole 90.

It will be appreciated that persons skilled in the art that the above embodiments have been described by way of example only, and not in any limitative sense, and that various alterations and modifications are possible without departure from the scope of the invention as defined by the appended claims.

The invention claimed is:

1. A *downhole work string having a first* packer apparatus for providing [an] *a first* annular seal in a downhole well casing or an open borehole*, a second packer apparatus for providing a second annular seal in the downhole well casing or the open borehole, and a ported sub positioned between the first and second packer apparatuses for performing a fracturing operation between the first and second annular seals*, the *first packer* apparatus comprising:

a *first* body arranged to be disposed in [a] *the downhole* well casing *or the open borehole, the first body having an internal bore that is configured to receive fracturing fluid that is supplied via the downhole work string*;

*a first elastomeric packer element;*

[an] *a first* activation member mounted to the *first* body *adjacent to the first elastomeric packer element*, wherein the *first* activation member is moveable relative to the *first* body to deform [an] *the first* elastomeric packer element outwardly relative to the *first* body to *thereby cause the first elastomeric packer element to* form [an] *the first* annular seal in the *downhole* well casing [in use] *or the open borehole*; and a *first* plurality of pistons arranged to move the *first* activation member relative to the *first* body, each [said piston] *of the first plurality of pistons* defining a respective pressure chamber arranged to be filled with *the fracturing* fluid in response to an increase in fluid pressure in the *internal bore of the first* body [to move each of the plurality of] *that is caused when the fracturing fluid is supplied via the downhole work string, wherein, as the respective pressure chamber defined by each of the first plurality of pistons is filled with the fracturing fluid, the first plurality of* pistons *move* relative to the *first* body [and cause] *which causes* the *first* activation member to move relative to the *first* body *to thereby deform the first elastomeric packer element and form the first annular seal;*

*the second packer apparatus comprising:*

*a second body having an internal bore that is also configured to receive the fracturing fluid that is supplied via the downhole work string;*

*a second elastomeric packer element;*

*a second activation member mounted to the second body adjacent to the second elastomeric packer element; and*

*a second plurality of pistons arranged to move the second activation member relative to the second body in response to the fracturing fluid being supplied via the downhole work string to thereby deform the second elastomeric packer element and form the second annular seal; and*

*the ported sub comprising:*

*a third body that is positioned between the first body and the second body, the third body having an internal bore that is also configured to receive the fracturing fluid that is supplied via the downhole work string; and*

*one or more ports that provide a fluid pathway from the internal bore of the third body to the downhole well casing or the open borehole such that, as the fracturing fluid is supplied via the downhole work string, the fracturing fluid:*

*(1) causes the first packer apparatus to form the first annular seal,*

*(2) causes the second packer apparatus to form the second annular seal, and*

*(3) ejects from the one or more ports of the ported sub to perform a fracturing operation between the first and second annular seals.*

[2. The apparatus according to claim 1, wherein the body comprises a cylindrical member having an internal bore defining a longitudinal axis, and wherein each said piston is mounted concentrically to the body such that a plurality of ports formed in the body enable fluid to flow from the bore to each said pressure chamber.]

[3. The apparatus according to claim 2, wherein each said pressure chamber defines an annular chamber arranged concentrically around the body.]

[4. The apparatus according to claim 2, wherein each said pressure chamber further comprises a stationary seal ring to provide a seal with the body for the respective pressure chamber.]

[5. The apparatus according to claim 1, wherein the activation member comprises a ramp adapted to slide under and deform outwardly a portion of said elastomeric packer element.]

[6. The method of providing an annular seal in a well casing or an open borehole, the method comprising:

locating the packer apparatus according to claim 1 in a downhole well casing or an open borehole; and moving each of said plurality of pistons relative to said body and cause said activation member to move relative to the body to deform the elastomeric packer element outwardly relative to the body to form an annular seal in the well casing or open borehole in use.]

*7. The downhole work string of claim 1, wherein the second plurality of pistons are mounted around the second body.*

*8. The downhole work string of claim 1, wherein the first body comprises a plurality of ports that fluidly connect the pressure chambers with the internal bore of the first body.*

*9. The downhole work string of claim 8, further comprising:*

*a seal ring for each pressure chamber.*

*10. The downhole work string of claim 1, wherein the first body comprises one or more annularly arranged pressure ports that fluidly connect one or more of the pressure chambers with the downhole well casing or the open borehole.*

*11. The downhole work string of claim 1, wherein the ported sub comprises a plurality of ports spaced around the third body.*

*12. The downhole work string of claim 1, wherein each of the first plurality of pistons form a part of an outer housing of the first packer apparatus.*

*13. The downhole work string of claim 1, wherein each of the second plurality of pistons form a part of an outer housing of the second packer apparatus.*

*14. The downhole work string of claim 1, wherein the first activation member is positioned around the first body and the second activation member is positioned around the*

*second body, the first and second bodies being positioned in the downhole work string on opposing sides of the third body.*

*15. The downhole work string of claim 1, wherein the first activation member is part of one of the first plurality of pistons.*

*16. The downhole work string of claim 1, wherein the second activation member is part of one of the second plurality of pistons.*

*17. The downhole work string of claim 1, wherein the first activation member extends from one of the first plurality of pistons.*

*18. The downhole work string of claim 1, wherein the second activation member extends from one of the second plurality of pistons.*

*19. A method for repeatedly performing fracturing operations in a downhole well casing or an open borehole, the method comprising:*

*positioning the downhole work string of claim 1 at a first location within the downhole well casing or the open borehole;*

*while the downhole work string is at the first location, supplying the fracturing fluid via the downhole work string at a pressure that causes the first packer apparatus to form the first annular seal, to cause the second packer apparatus to form the second annular seal and to cause the fracturing fluid to eject from the one or more ports of the ported sub and into the downhole well casing or the open borehole to thereby conduct the fracturing operation at the first location;*

*reducing the pressure of the fracturing fluid supplied via the downhole work string to thereby cause the first packer apparatus to cease forming the first annular seal and to cause the second packer apparatus to cease forming the second annular seal at the first location;*

*after the first packer apparatus ceases forming the first annular seal and the second packer apparatus ceases forming the second annular seal at the first location, positioning the downhole work string at a second location within the downhole well casing or the open borehole; and*

*while the downhole work string is at the second location, supplying the fracturing fluid via the downhole work string at the pressure that causes the first packer apparatus to form the first annular seal, to cause the second packer apparatus to form the second annular seal and to cause the fracturing fluid to eject from the one or more ports of the ported sub and into the downhole well casing or the open borehole to thereby conduct the fracturing operation at the second location.*

*20. The method of claim 19, further comprising:*

*reducing the pressure of the fracturing fluid supplied via the downhole work string to thereby cause the first packer apparatus to cease forming the first annular seal and to cause the second packer apparatus to cease forming the second annular seal at the second location;*

*after the first packer apparatus ceases forming the first annular seal and the second packer apparatus ceases forming the second annular seal at the second location, positioning the downhole work string at a third location within the downhole well casing or the open borehole; and*

*while the downhole work string is at the third location, supplying the fracturing fluid via the downhole work string at the pressure that causes the first packer apparatus to form the first annular seal, to cause the second packer apparatus to form the second annular seal and to cause the fracturing fluid to eject from the one or more ports of the ported sub and into the downhole well casing or the open borehole to thereby conduct the fracturing operation at the third location.*

*21. The method of claim 19, wherein supplying the fracturing fluid via the downhole work string comprises pumping the fracturing fluid into the downhole work string.*

*22. The method of claim 19, further comprising:*

*positioning the downhole work string at one or more additional locations within the downhole well casing or the open borehole and performing the fracturing operation at the one or more additional locations without first removing the downhole work string from the downhole well casing or the open borehole.*

* * * * *